(12) United States Patent
Miga

(10) Patent No.: US 7,257,244 B2
(45) Date of Patent: Aug. 14, 2007

(54) ELASTOGRAPHY IMAGING MODALITIES FOR CHARACTERIZING PROPERTIES OF TISSUE

(75) Inventor: Michael I. Miga, Franklin, TN (US)

(73) Assignee: Vanderbilt University, Nashville, TN (US)

( * ) Notice: Subject to any disclaimer, the term of this patent is extended or adjusted under 35 U.S.C. 154(b) by 726 days.

(21) Appl. No.: 10/787,056

(22) Filed: Feb. 24, 2004

(65) Prior Publication Data

US 2004/0234113 A1 Nov. 25, 2004

Related U.S. Application Data

(60) Provisional application No. 60/449,780, filed on Feb. 24, 2003.

(51) Int. Cl.
*G06K 9/00* (2006.01)
(52) U.S. Cl. ..................................... 382/128; 382/218
(58) Field of Classification Search ................ 382/128, 382/129, 130, 131, 132, 133, 134; 378/37; 600/533; 602/58; 607/901; 700/28, 171, 700/173
See application file for complete search history.

(56) References Cited

U.S. PATENT DOCUMENTS 5,926,568 A * 7/1999 Chaney et al. ............... 382/217
6,728,567 B2 * 4/2004 Rather et al. ................ 600/407

OTHER PUBLICATIONS

R. Muthupillai et al., "Magnetic-Resonance Elastography By Direct Visualization of Propagating Acoustic Strain Waves," Science, vol. 269, pp. 1854-1857, 1995.

E. E. W. Van Houten et al., "Elasticity Reconstruction From Experimental MR Displacement Data: Initial Experience With An Overlapping Subzone Finite Element Inversion Process," Medical Physics, vol. 27, pp. 101-107, 2000.
R. Sinkus et al., "High-Resolution Tensor MR Elastography For Breast Tumour Detection," Physics in Medicine and Biology, vol. 45, pp. 1649-1664, 2000.
J. Bishop, et al., "Two-Dimensional MR Elastography With Linear Inversion Reconstruction: Methodology And Noise Analysis," Physics in Medicine and Biology, vol. 45, pp. 2081-2091, 2000.
J. Ophir et al., "Elastography: A Systems Approach," International Journal of Imaging Systems and Technology, vol. 8, pp. 89-103, 1997.
J. Ophir et al., "Elastography : A Quantitative Method For Imaging The Elasticity Of Biological Tissues," Ultrasonic Imaging, vol. 13, pp. 111-134, 1991.
T. L. Chenevert et al., "Elasticity Reconstructive Imaging By Means Of Stimulated Echo MRI," Magnetic Resonance in Medicine, vol. 39, pp. 482-490, 1998.

(Continued)

*Primary Examiner*—Samir Ahmed
*Assistant Examiner*—Abolfazl Tabatabai
(74) *Attorney, Agent, or Firm*—Akin Gump Strauss Hauer & Feld LLP

(57) ABSTRACT

An image reconstruction algorithm begins with an initial acquisition of a preoperative imaging volume followed by a second imaging sequence subsequent to an applied deformation. A computational domain (model) is generated from the preoperative image series and boundary conditions are derived from a pre-post deformation comparison, as well as from information gathered from deformation source application (i.e., displacement and/or force). Using boundary conditions, a series of model-based image deformations is accomplished while varying model material properties. A calculation of a Jacobian matrix relating the change in regional mutual information is performed with respect to the change in material properties. Upon completion of this process, matrix regularization techniques are used to condition the system of equations and allow for inversion and subsequent delivery of model-property adjustments.

21 Claims, 27 Drawing Sheets

OTHER PUBLICATIONS

D. B. Plewes, et al., "Visualization And Quantification Of Breast Cancer Biomechanical Properties With Magnetic Resonance Elastography," Phys. in Med. and Bio., vol. 45, pp. 1591-1610, 2000.

A. Manduca et al., "Spatio-Temporal Directional Filtering For Improved Inversion Of MR Elastography Images," Medical Image Analysis, pp. 465-473, 2003.

N. Gokhale et al., "Simultaneous Elastic Image Registration and Elastic Modulus Reconstruction," IEEE Transactions on Medical Imaging, pp. 543-546, 2004.

M. M. Doyley et al., "Evaluation of An Iterative Reconstruction Method for Quantitative Elastography," Physics in Medicine and Biology, vol. 45, pp. 1521-1540, 2000.

E. E. W. Van Houten et al., "Three-Dimensional Subzone-Based Reconstruction Algorithm For MR Elastography," Magnetic Resonance in Medicine, vol. 45, pp. 827-837, 2001.

J. B. Fowlkes et al., "Magnetic-Resonance Imaging Techniques For Detection Of Elasticity Variation," Medical Physics, vol. 22, pp. 1771-1777, 1995.

A. Samani et al., "A Constrained Modulus Reconstruction Technique For Breast Cancer Assessment," IEEE Transactions on Medical Imaging, vol. 20, No. 9, pp. 877-885, 2001.

R. Muthupillai et al., "Magnetic Resonance Imaging Of Transverse Acoustic Strain Waves," Magnetic Resonance in Medicine, vol. 36, pp. 266-274, 1996.

K. J. Parker et al., "Techniques For Elastic Imaging: A Review," IEEE Engineering in Medicine and Biology, vol. 96, pp. 52-59, 1996.

B. S. Garra et al., "Elastography Of Breast Lesions: Initial Clinical Results," Radiology, vol. 202, pp. 79-86, 1997.

J. Ophir et al., "Elastography: Ultrasonic Estimation And Imaging Of The Elastic Properties Of Tissues," IMechE, vol. 213, Part H, pp. 203-223, 1999.

C. Sumi et al., "Estimation Of Shear Modulus Distribution In Soft Tissue From Strain Distribution," IEEE Transactions on Biomedical Engineering, vol. 42, No. 2, pp. 193-202, 1995.

A. P. Sarvazyan et al., "Biophysical Bases Of Elasticity Imaging," Accoustical Imaging, vol. 21, pp. 223-240, 1995.

S. A. Kruse et al., "Tissue Characterization Using Magnetic Resonance Elastography: Preliminary Results," Physics in Medicine and Biology, vol. 45, pp. 1579-1590, 2000.

L. V. Tsap et al., "Nonrigid Motion Analysis Based on Dynamic Refinement of Finite Element Models," IEEE Transactions on Pattern Analysis and Machine Intelligence, vol. 22, No. 5, pp. 526-543, 2000.

* cited by examiner

ELASTOGRAPHY IMAGING MODALITIES FOR CHARACTERIZING PROPERTIES OF TISSUE

CROSS-REFERENCE TO RELATED APPLICATIONS

This application claims the benefit of U.S. Provisional Patent Applications No. 60/449,780 filed on Feb. 24, 2003, entitled "Elastography Imaging Modalities for Characterizing Properties of Tissue" the entire contents of which is incorporated by reference herein.

BACKGROUND OF THE INVENTION

With respect to breast cancer detection, the use of palpation by self-exams is still the first line of investigation in diagnosis. There is a long-standing precedent in the medical community to use tissue stiffness as a direct indicator of organ health. In the event of an abnormality detected by palpation or mammographic screening, often traditional imaging modalities such as magnetic resonance (MR), computed tomography (CT) and ultrasonic (US) imaging are employed to enhance and aid medical diagnosis by allowing the non-invasive visualization of internal structure within the breast. Additionally, these modalities are often used to aid in biopsy of suspicious tissue. These more sophisticated imaging modalities have become a standard component of today's clinical armamentarium but have not shown clinical significance with respect to detection and differentiation of cancerous tissue in the breast. Historically, increased mechanical stiffness during tissue palpation exams has been associated with assessing organ health as well as in detecting the growth of a potentially life-threatening cell mass.

In recent years, this need has manifested itself in the creation of less traditional imaging techniques which aim to analyze electrical, optical and mechanical properties of tissue with the goal of finding better diagnostic indicators. For example, electrical impedance tomography is a technique that systematically injects electrical current into the breast and measures the potential at the tissue surface. This data can then be used to reconstruct images of electrical conductivity and permittivity which may be better pathologic indicators. Other examples are near infrared tomography, microwave tomography and elastography. These emerging methods of characterizing tissue have yet to be realized and questions regarding resolution, diagnostic value, and overall capability have yet to be fully reported. When considering past work in ultrasound elastography (USE) and magnetic resonance elastography (MRE), the basis for image reconstruction has been the measurement of displacement or force within or at the boundaries of the tissue of interest.

Elasticity image reconstruction has two immediate uses in the larger medical community. First, it is widely accepted that disease correlates with changes in tissue stiffness, hence the use of palpation techniques for the assessment of tissue health. In addition, recent reports have suggested that diagnostic discrimination of tissue malignancy may be possible using tissue stiffness as a metric. A second application of elastography is concerned with generating accurate computational models for image-guidance applications. The fidelity of these applications will rely heavily on the degree to which the model matches the actual physical description of the organ/tissue of interest. Elastography serves the function of providing patient-specific material properties especially in the region of the pathology, i.e., tumor identification. As such, elastographic imaging techniques (i.e., direct imaging of tissue stiffness) have recently become of great interest to scientists.

BRIEF SUMMARY OF THE INVENTION

The present invention comprises a method called Modality Independent Elastography (MIE) within the context of mammographic imaging. Measures of image similarity are used in conjunction with computational models to reconstruct images of tissue stiffness. The real strength in this approach is that images from any modality (e.g., magnetic resonance, computed tomography, ultrasound, etc.) that have sufficient anatomically-based intensity heterogeneity and remain consistent from a pre- to a post-deformed state could be used in this paradigm. Results illustrate: (1) the encoding of stiffness information within the context of a regional image similarity criterion, (2) the methodology for an iterative elastographic imaging framework and (3) successful elasticity reconstructions.

In another aspect, the present invention is a general method for determining image similarities using similarity metrics and optimization techniques.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, embodiments of the preferred implementation currently in use are presented. It should be understood, however, that the invention is not limited to the precise arrangements and instrumentalities shown.

In the drawings.

DETAILED DESCRIPTION OF THE INVENTION

Figure 1:
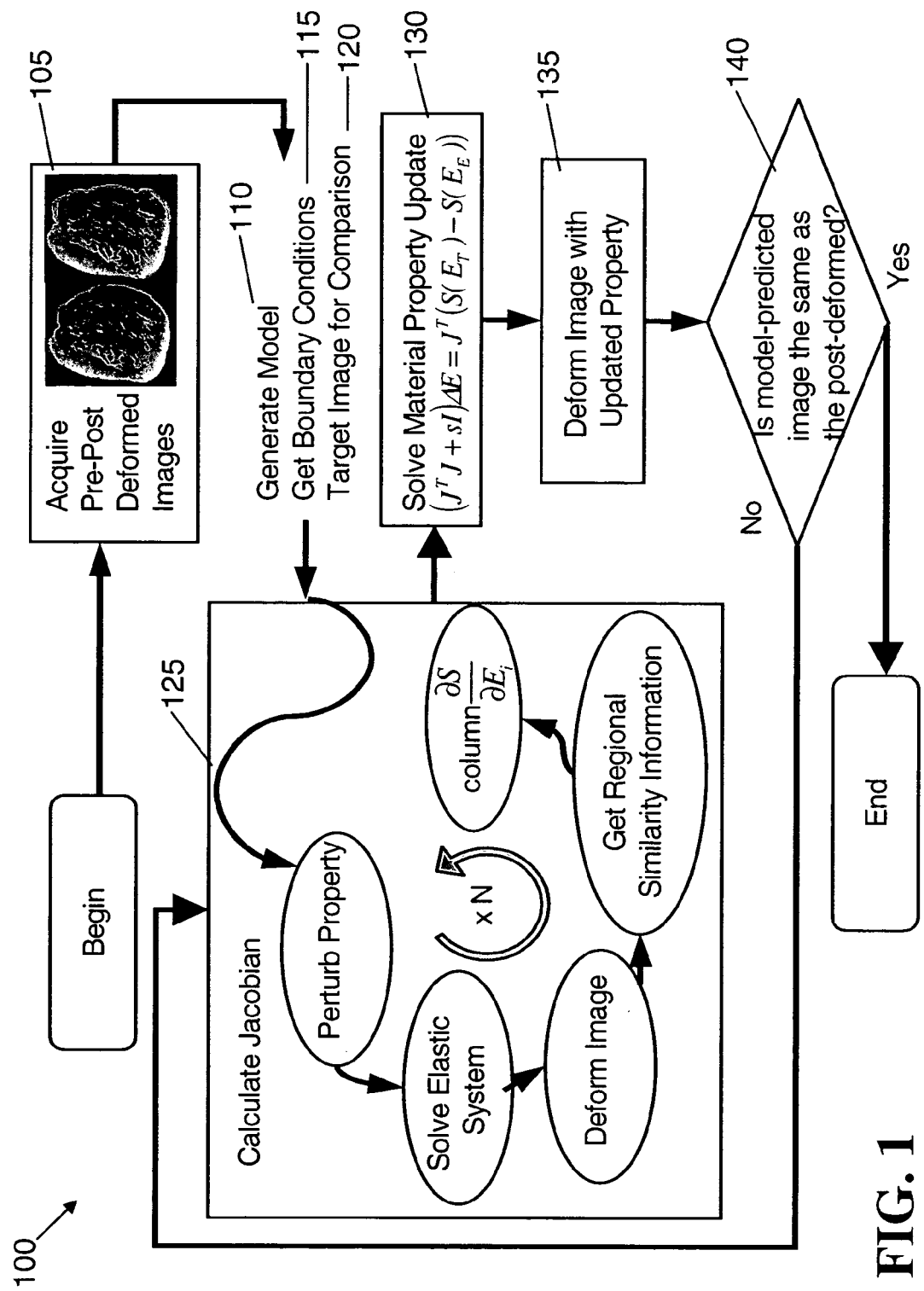
FIG. 1 is a flow chart showing the steps of an image reconstruction algorithm in accordance with a preferred embodiment of the present invention.

Elastography uses finite elements, mutual information, and an iterative image reconstruction framework to produce images of elastic modulus (i.e., Young's modulus). The present invention represents a fundamental shift away from an objective function based on displacements/forces to that of one based solely on image similarity. By reformulating the inverse problem in this manner, the technique departs from a traditional elastography method to one more closely related to the recent advances in non-rigid image-registration. Since the basis of this new image reconstruction framework is not a function of any particular imaging measurement protocol (e.g., MR phase-encoding of displacement, or US cross-correlation methods, etc.), the approach is independent of any specific imaging modality. Results demonstrate: (1) the encoding of elasticity within a locally-defined image similarity measure, (2) the framework of the elasticity imaging algorithm, and (3) some preliminary elasticity reconstructions from an idealized simulation.

The present invention includes a new method of elastography within the context of mammographic imaging.

The basis for the image reconstruction framework combines techniques from information theory, numerical analysis, and image processing. The process begins with the acquisition of a two image set series in which the tissue of interest is imaged before (source image) and after (target image) a controlled deformation. A finite element model is then constructed from the source image series and boundary conditions are applied to simulate tissue compression. Within the work presented here, the initial property distribution is assumed to be homogeneous. However, that this does not need to be the case; a priori structural information from the images may easily be incorporated. Subsequent to the numerical calculation, the resulting displacement field is used to deform the source image. The deformed source image is then compared to the target image within the context of an image similarity objective function and can serve as the basis for a material property update. This iterative process continues until a convergence condition is met, i.e., until the deformed source image matches the target image. While disclosed herein as a two-dimensional process, the framework within this invention could be readily designed in three-dimensions as well. Such added dimensionality increases the complexity of the code but the framework underlying elasticity image reconstruction is identical.

1. Image Similarity

Image similarity is used as a vehicle for guiding material property updates in an elastographic reconstruction framework. Although not limited to any particular similarity method, mutual information (MI) is an intuitive starting point for this work. Central to MI is the Shannon entropy, H, which relates to the average information supplied by a given set of parameters, s, whose probabilities are given by P(s). The expression for the Shannon entropy with respect to a discrete parameter probability is, $$H = -\sum_i P(s_i) \log(P(s_i)).$$

With the realization that the source and target images can be expressed in terms of a probability distribution function (PDF) of intensity (i.e., entropy can be written with respect to the distribution of intensity within an image, e.g., $$H(I_1) = -\sum_i \sum_j PDF_{ij} \log(PDF_{ij})$$

where i,j represent the row and column indices of image $I_1$), mutual information can be defined as, $$M(I_1, I_2) = H(I_1) + H(I_2) - H(I_1, I_2) \qquad (1)$$

where $I_1, I_2$ are two images in which the mutual information is desired and $H(I_1, I_2)$ is the joint entropy of both images. It also has been shown that normalizing the mutual information metric is helpful, $$M(I_1, I_2) = \frac{H(I_1) + H(I_2)}{H(I_1, I_2)}, \qquad (2)$$

and is often referred to as normalized mutual information. As an initial similarity measure, normalized MI as reported by Fitzpatrick, Maurer, and Hill can be utilized by t the present invention. MI has been used widely for the registration of multi-modality image sets. The technique has also been used in various non-rigid registration problems to include those using elastic matching and specifically non-rigid registration of the breast.

Traditionally, the use of MI within registration processes has involved its determination as a global measure of image alignment to be maximized with respect to alignment parameters (three parameters in 2D, position (x,y) and orientation, θ). This limited parameter set size allows for traditional optimization frameworks to be relatively well behaved. However, within an image reconstruction application, several hundred parameters may be needed to adequately describe the spatial distribution of mechanical properties. As a result, a normalized regional mutual information (RMI) metric is utilized here to spatially parameterize the similarity between the deformed source and target image sets. In a sense, the RMI metric is serving to spatially sample similarity that will provide the information needed to determine a spatially varying material property distribution. Extending the RMI metric to represent similarity with a regional image volume is straightforward and would facilitate the implementation of this strategy in three-dimensions.

2. Computational Modeling

Another step in this process is the generation of the deformed source image. For this task, a set of partial differential equations associated with a linearly elastic model and assumptions of plane strain is utilized to simulate tissue compression. In cases of quasi-static loading, results from the MR and US elastographic literature have shown encouraging results when using these two-dimensional approximations. To solve the ensuing system of equations associated with a finite element formulation of the problem, a standard Galerkin weighted residual approach is used with Lagrange polynomial basis functions. Although disclosed within this embodiment as a two-dimensional planar problem, the general framework is easily extended to three-dimensions and would involve the full three-dimensional form of the equations of equilibrium.

3. Image Reconstruction

The mechanics of the inverse problem rely on the minimization of an objective function, G(E), defined as the square of an image similarity residual, $$G(E) = \sum_{i=1}^{M} (S(E_T)_i - S(E)_i)^2. \qquad (3)$$

where $S(E_T)_i$ is the $i^{th}$ maximum similarity index, i.e., similarity measure between deformed target image and itself, and $S(E)_i$ is the $i^{th}$ similarity measure between deformed source image and target image. The equation (3) is expressed as a summation over M regions of similarity (i.e., normalized mutual information is determined over a series of M grid squares). To minimize equation (3), the derivative with respect to the material distribution, E, must be calculated and set to zero $$\frac{\partial G}{\partial E} = [J^T](S(E_T) - S(E)) = 0. \qquad 4)$$

where $$[J] = \frac{\partial S(E)}{\partial E}$$

is the M×N material Jacobian matrix (note bold face indicates vector notation). Using a Newton-Raphson based approach to solve (4), the following is written:

$$E_{k+1} = E_k + \frac{J^T(S(E_T) - S(E))}{J^T J}. \qquad (5)$$

In many other methodologies that use a similar non-linear iterative-based algorithm, the Jacobian matrix is usually $$J = \frac{\partial \bar{u}^c}{\partial E}$$

where $\bar{u}^c$ may be the calculated displacements. This marks a fundamental shift away from the need for a direct measurement/comparison of displacement. Of course this simplification does come at a computational cost in that the Jacobian as defined in equations (4,5) must be calculated numerically, i.e., secant estimate of derivative. To solve the non-square system of equations in (5), the property update is calculated from the expression, $$(J^T J + \lambda I)\Delta E = J^T(S(E_t) - S(E)) \qquad (6)$$

where $\lambda$ is a standard Marquardt matrix regularization parameter and I is the identity matrix. With equation (6), the framework is provided for iteratively updating the material properties within the scanning region. Another often useful operation within the context of an image reconstruction scheme is to perform spatial averaging either between iterates or at some interval to enhance numerical stability and was performed here.

FIG. 1 shows the overall approach to reconstructing elastographic images. FIG. 1 is a flow chart showing the steps of an image reconstruction algorithm 100 in accordance with a preferred embodiment of the present invention. The algorithm begins with an initial acquisition of a preoperative imaging volume followed by a second imaging sequence subsequent to an applied deformation (step 105). A computational domain (model) is generated from the preoperative image series (step 110) and boundary conditions are derived (step 115) from a pre-post deformation comparison, as well as from information gathered from deformation source application (i.e., displacement and/or force). Using these boundary conditions, a series of model-based image deformations are accomplished while varying model material properties. This process will effectively allow the calculation of a Jacobian matrix (step 125) relating the change in regional mutual information with respect to the change in material properties when being compared to the target image (step 120). Upon completion of this process, matrix regularization techniques are used to better condition the system of equations and thus allow for inversion and subsequent delivery of model-property adjustments (step 130). In addition, spatial averaging of material properties is used to further help stabilize the iterative updating process. When the model-deformed baseline image (i.e., source) matches the acquired deformed image (i.e., target) (steps 135, 140), the process has converged. The algorithm 100 may be programmed using any traditional computer language, such as Fortran, C, and the like.

An exemplary coding scheme follows:

ALGORITHM 100
1. {ACQUIRE IMAGE(S) OF SUBJECT, $I_1$}
2. {ACQUIRE IMAGE(S) OF SUBJECT EXPERIENCING "USER-PRESCRIBED DEFORMATION", $I_2$}
3. {BUILD BIOMECHANICAL MODEL FROM $I_1$ WITH MATERIAL PROPERTIES DEFINED SPATIALLY (E.G. FINITE ELEMENT LINEAR ELASTIC MODEL WITH NODE-BASED DEFINITION OF YOUNG'S MODULI AND POISSON'S RATIO, $E_i$ AND $V_i$, RESPECTIVELY, WHERE i REFERS TO THE $i^{th}$ MATERIAL PROPERTY WITHIN THE SPATIAL DOMAIN AND VARIES FROM i=1 TO N MATERIAL PROPERTIES)}
4. {USING THE MODEL GENERATED IN STEP 3, SIMULATE THE "USER-PRESCRIBED DEFORMATION" AS DEFINED IN STEP 2}
5. {APPLY THE CALCULATED DEFORMATIONS FROM STEP 4 TO THE $I_1$ IMAGE(S) TO CREATE $I_{ISIM}$}
6. {COMPARE $I_{ISIM}$ TO $I_2$ WITHIN THE CONTEXT OF AN IMAGE SIMILARITY FUNCTION DEFINED OVER M REGIONS (E.G. BREAK SPATIAL DOMAIN INTO M EQUAL-SIZED GRID SQUARES AND CALCULATE THE NORMALIZED MUTUAL INFORMATION BETWEEN THE TWO IMAGES OVER EACH DOMAIN $S(E)_j$ WHERE S REPRESENTS THE COMPARISON, E REPRESENTS THE CURRENT MATERIAL PROPERTY ESTIMATE, AND j IS THE $j^{th}$ OF THE M REGIONS)}
7. {WHILE LOOP: WHILE $I_{ISIM}$, $I_2$ COMPARISON IS DISSIMILAR TO A USER-PRESCRIBED TOLERANCE, DO THE FOLLOWING}
   a. {BUILD JACOBIAN MATRIX, $$J = \frac{\partial S}{\partial E},$$

WHICH IS M rows ×N columns}
     i. {LOOP [i=1 to N]: PERTURB INDIVIDUAL MATERIAL PROPERTY (i OF N PROPERTIES)}
     ii. {WITH NEW PROPERTY DESCRIPTION BASED ON PERTURBATION IN (i), SIMULATE DEFORMATION AS IN STEP 4}
     iii. {APPLY CALCULATED DEFORMATIONS FROM STEP (ii) TO THE $I_1$, IMAGE(S) AND CREATE NEW $I_{ISIM}$}
     iv. {COMPARE $I_{ISIM}$ TO $I_2$ WITHIN THE CONTEXT OF AN IMAGE SIMILARITY FUNCTION DEFINED OVER M REGIONS AS IN STEP 6 (THIS COMPARISON PRODUCES AN ARRAY THAT REPRESENTS THE M rows OF THE $i^{th}$ column OF THE JACOBIAN MATRIX, J}
     v. {END LOOP [i=1 to N]} b. {BUILD HESSIAN MATRIX $H=[J^T][J]+\lambda I$}
c. {CALCULATE $\Delta E$}

$\Delta E = (H)^{-1}(J^T(S(E_{TRUE})-S(E)))$ d. {CALCULATE NEW PROPERTY DISTRIBUTION, $E_{NEW}$}

$E_{NEW}=E+\Delta E$ e. {*IMAGE PROCESSING OPERATIONS}
8. {END WHILE LOOP}
9. {OUTPUT MATERIAL PROPERTY DISTRIBUTION E}

Figure 2:
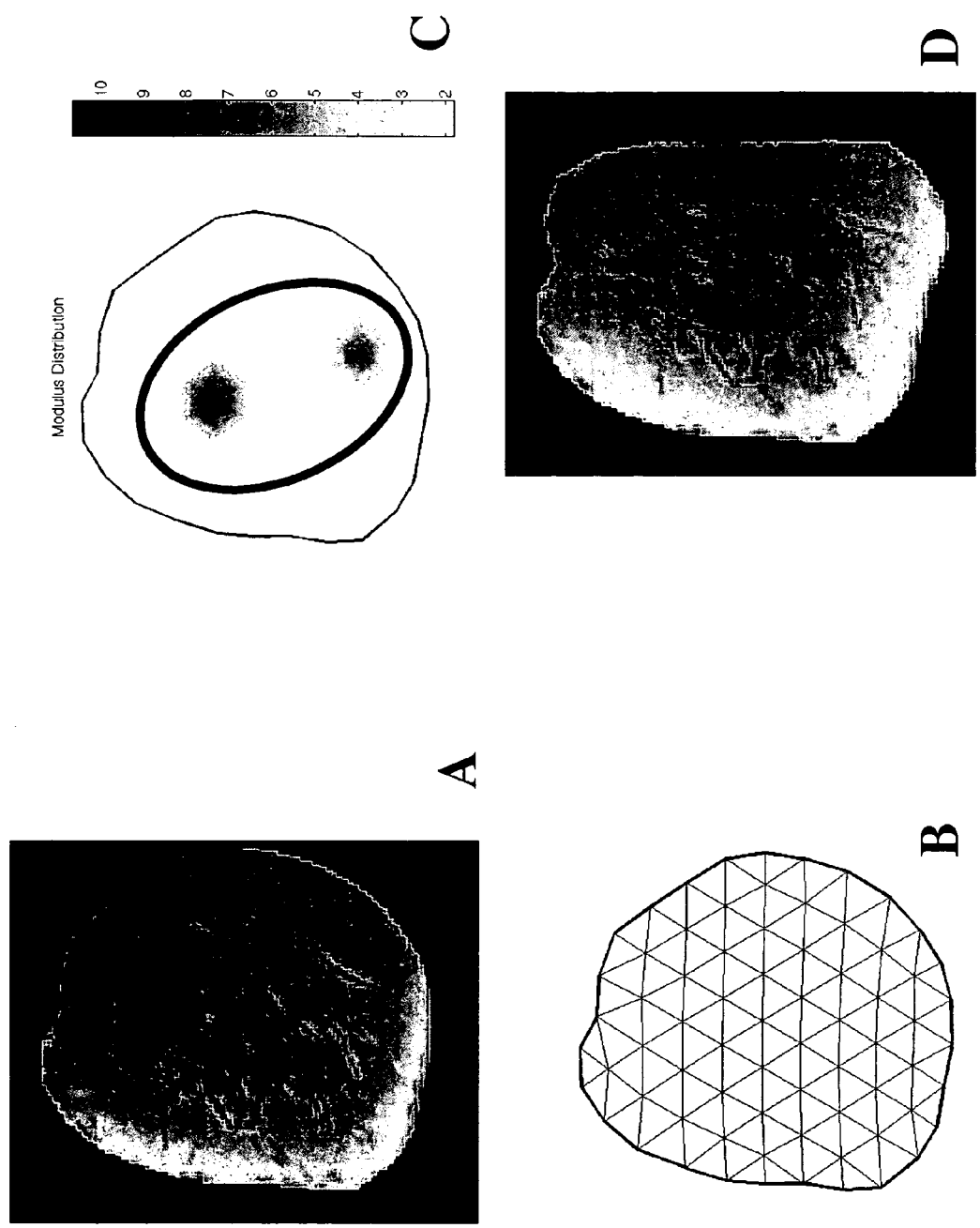
FIG. 2A shows a coronal cross sectional magnetic resonance (MR) slice of a breast used as a source image of an idealized image reconstruction simulation using the algorithm of FIG. 1.
FIG. 2B shows a computational domain derived from the MR slice of FIG. 2A.
FIG. 2C shows a modulus property distribution which will serve as the target stiffness image within the image reconstruction framework.
FIG. 2D shows a simulated deformed breast using a finite element model (FEM) and the property description of FIG. 2C.

KEY:
{*IMAGE PROCESSING OPERATIONS} ARE GENERALIZED HERE TO INDICATE ANY PROCESSING OPERATION TO ADJUST MATERIAL PROPERTY VALUES TO ENHANCE ALGORITHM PERFORMANCE (E.G. SPATIAL AVERAGING TO SMOOTH THE SOLUTION)
E IS THE CURRENT ESTIMATE OF MATERIAL PROPERTY VALUES
$E_{TRUE}$ IS THE TRUE MATERIAL PROPERTY DISTRIBUTION
$S(E_{TRUE})$ IS THE IDEAL REGIONAL SIMILARITY (E.G. THIS IS A CONSTANT AND REPRESENTS THE BEST POSSIBLE SIMILARITY VALUE, I.E. THE VALUE BETWEEN THE DEFORMED IMAGE $I_2$ AND ITSELF)
S(E) IS THE REGIONAL SIMILARITY BASED ON CURRENT PROPERTY ESTIMATES (I.E. SIMILARITY BETWEEN $I_2$ AND $I_{ISIM}$)
$\lambda I$ IS A REGULARIZATION MATRIX WHERE BY $\lambda$ REPRESENTS THE REGULARIZATION VALUE AND I IS THE IDENTITY MATRIX For feasibility and demonstration purposes, an idealized image reconstruction simulation is presented within the context of a mammographic imaging application. FIG. 2A illustrates a coronal cross-sectional slice of the breast which will be used as the source image for this simulation. FIG. 2B represents the computational domain used for the simulation while FIG. 2C represents the distribution of Young's modulus. The highest material property shown corresponds to that of an invasive ductal carcinoma (106 kPa) while the mid-level stiffness corresponds to that of fibrous tissue (72 kPa) with a general background corresponding to that of normal fat (18 kPa). FIG. 2D represents a deformed image based on using finite elements and the property distribution shown in FIG. 2C. The boundary conditions applied simulate a rigid support fixing the left portion of the breast while a compressive plate-like device deforms the right-most portion. This image will serve as the target image for this simulation.

Following the simulated breast compression, the image reconstruction algorithm is provided the following data: (1) the source image (FIG. 2A), (2) a homogeneous moduli description of the computational domain, and (3) the boundary conditions derived from FIG. 2D. In addition, a user-selected subregion (27 of 71 total properties) was designated for material property reconstruction and is shown by the oval region in FIG. 2C. It is interesting to observe in this idealized simulation that there is no distinct intensity demarcation of the tumor within FIG. 2A. The only data indicating the presence of stiff tissue behavior is encoded in the displacements associated with a finite element model (FEM) in FIGS. 2B and 2C and in the corresponding deformed intensity pattern in FIG. 2D.

Figure 3:
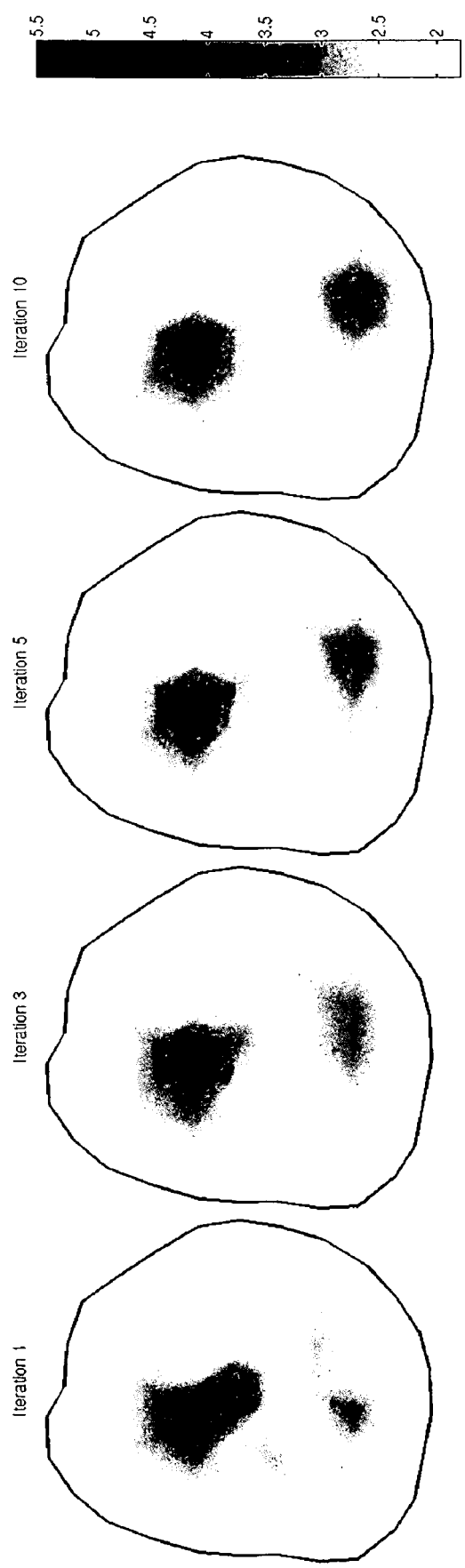
FIG. 3 shows a progression of iteratively reconstructed elasticity images using the algorithm of FIG. 1.
Figure 4:
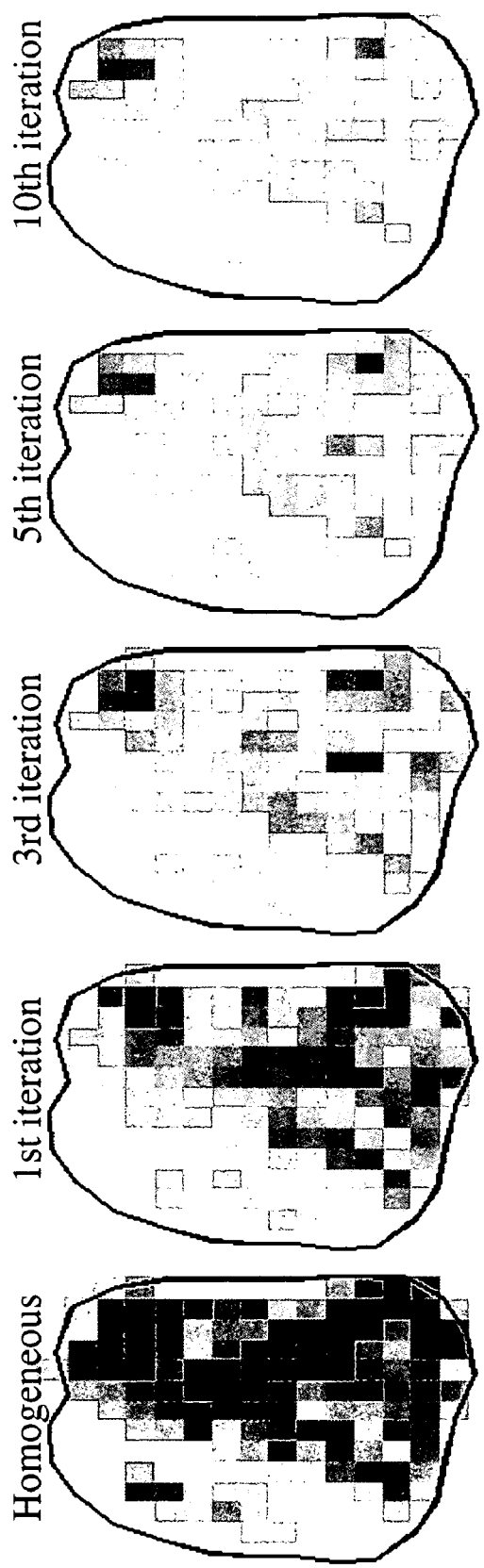
FIG. 4 shows regional mutual information (RMI) kernel distribution over the course of the image reconstruction using the algorithm of FIG. 1.
Figure 5:
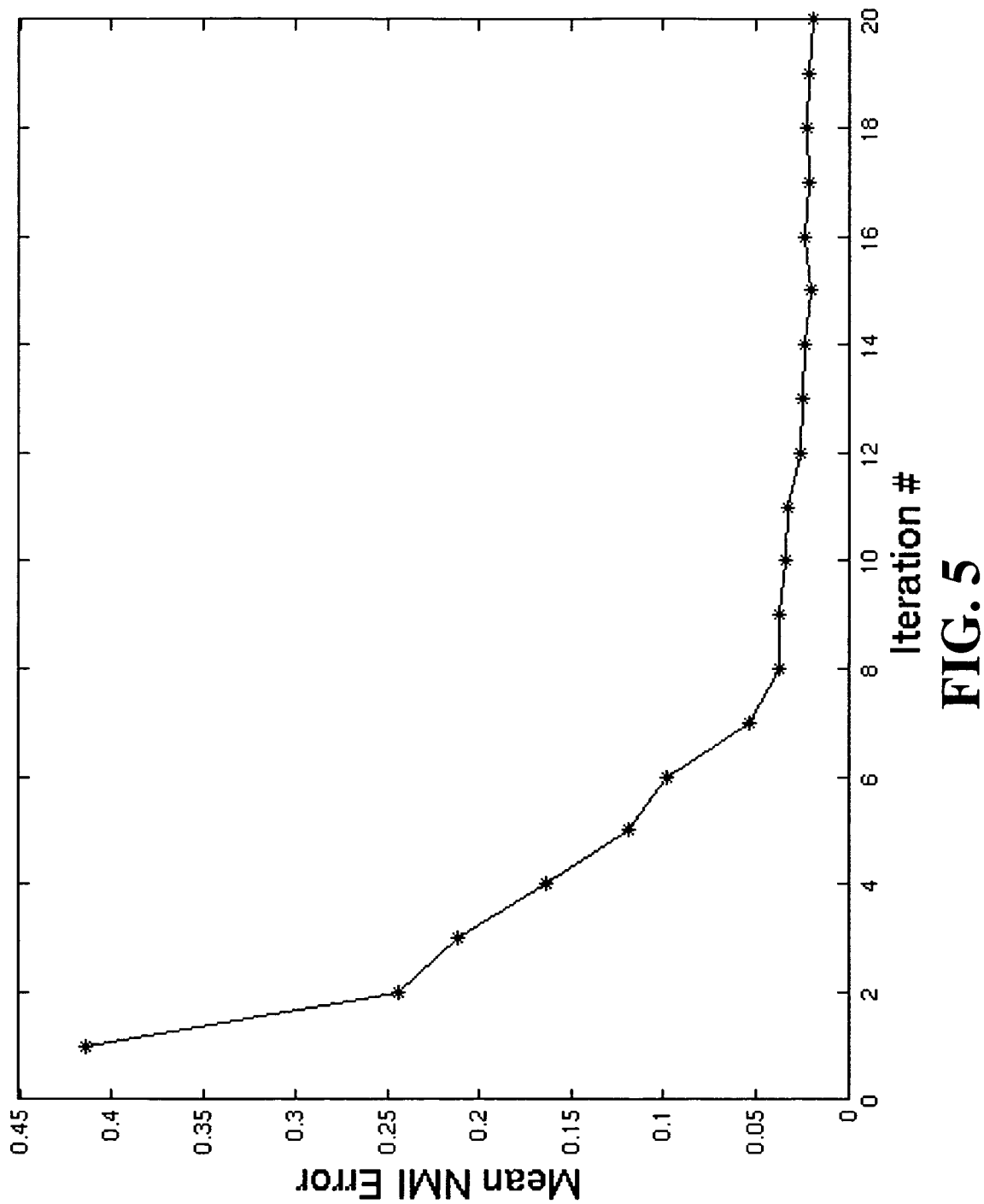
FIG. 5 shows a graphical representation of mean normalized mutual information (NMI) error for all RMI regions for each iteration using the algorithm of FIG. 1.

FIG. 3 represents the iterative reconstruction progress by presenting the image reconstructions at the $1^{st}$, $3^{rd}$, $5^{th}$, and $10^{th}$ iteration. With each iteration, there is a successive improvement in the elasticity image. It should be noted however, that the magnitudes of the stiffness values are under-predicted. This is primarily due to the use of spatial averaging as well as the selection of RMI parameters. For this image reconstruction, approximately 200 measures of image similarity were used for the reconstruction. Each RMI kernel (here kernel refers to RMI regional area) was approximately an 8×8 pixel² rectangular region. To better understand the progression of the reconstruction framework within the context of the RMI metric, FIG. 4 shows the distribution of RMI for the initial guess of homogeneity, and the $1^{st}$, $3^{rd}$, $5^{th}$, and $10^{th}$ iteration (for reference, the lighter the region, the more similar the deformed source image is to the target image). Within this progression, a steady improvement is seen, especially in the early iterations. FIG. 5 illustrates the mean RMI metric over all regions for each iteration in the reconstruction process. FIG. 5 demonstrates algorithm convergence with the most productive iterations occurring early in the image formation process.

Figure 6:
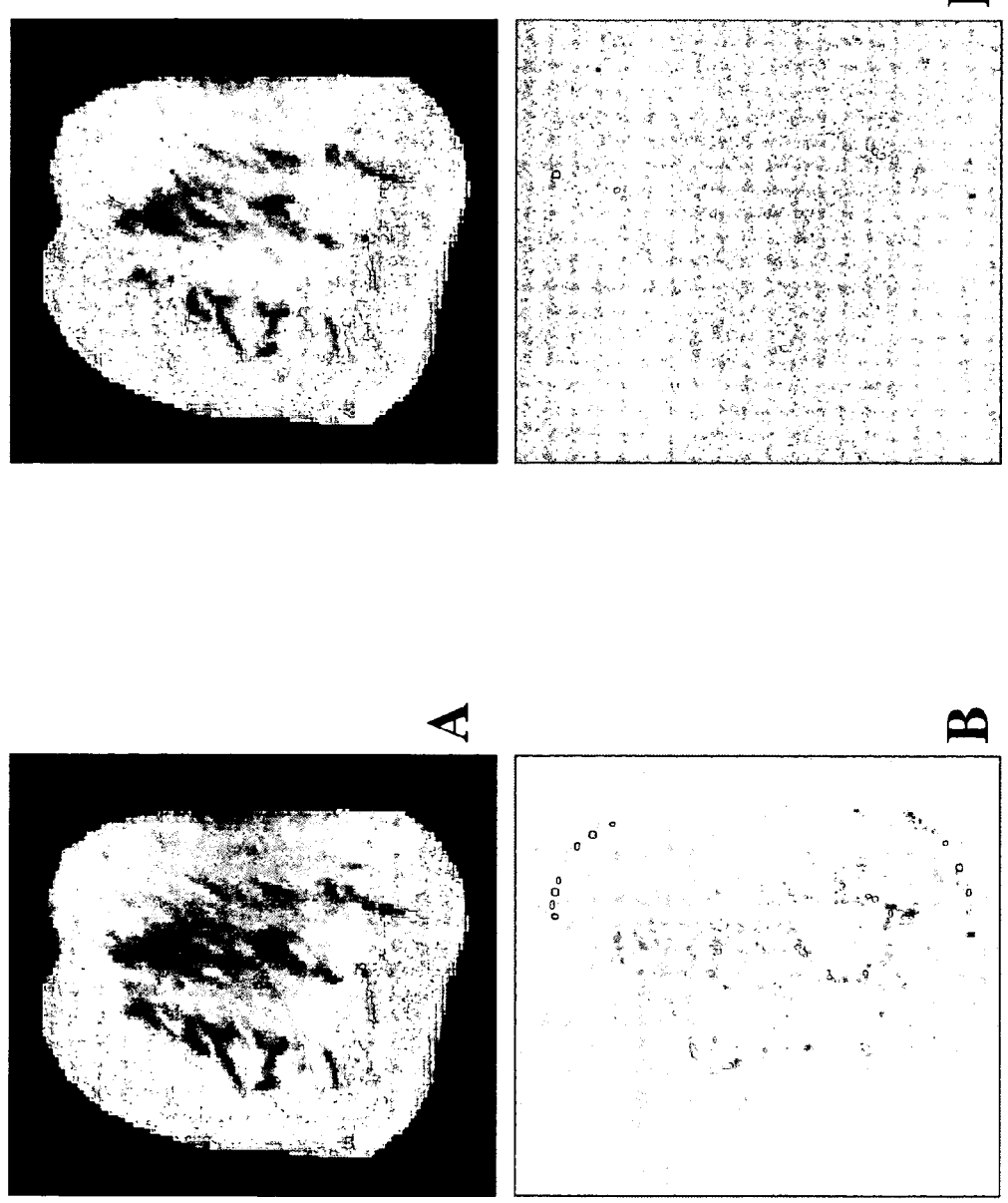
FIG. 6A shows a deformed source image using a homogeneous modulus description.
FIG. 6B shows a difference image between FIG. 6A and the target image in FIG. 2D.
FIG. 6C shows the deformed source image using the reconstructed modulus description of Iteration 10, FIG. 3.
FIG. 6D shows the difference image between the reconstructed image in FIG. 6C and using the reconstructed modulus description of Iteration 10, FIG. 3 and the target image in FIG. 2D.

As referred to earlier, this technique is similar to the non-rigid image registration work that has had widespread interest in medical imaging community. In some sense, the process shown in FIGS. 3 and 4 is an iterative non-rigid registration problem where the material properties have become the vehicle for image alignment. To further appreciate this analogy, FIGS. 6A-6D show two sets of images with the first set (FIGS. 6A and 6B) showing the deformed source image using a homogeneous modulus description and a difference image compared to the target, while the second set (FIGS. 6C and 6D) shows the same comparison using the reconstructed modulus description of FIG. 3. For a perfect difference image, the results in FIGS. 6B and 6D are the same shade as the background. Here it is clear that the reconstructed image achieves a better registration to the target image.

The algorithm 100 presented in FIG. 1 and equations (1)-(6) demonstrate a fundamentally new approach to performing elastographic imaging. The strategy takes advantage of the recent advances in non-rigid image registration to iteratively reconstruct the distribution of material properties based on general image similarity principles. In addition, its reliance on image similarity in lieu of specific displacement measurement techniques allows the approach to be independent of imaging platform.

The results shown in FIGS. 3-5 demonstrate that this strategy is robust enough to detect small perturbations in image patterns due to non-visible stiff anomalies. The systematic sampling of the similarity condition through the use of a normalized regional mutual information metric allows for the spatial encoding of image changes when subjected to deformation. The results in FIGS. 6A-6D illustrate the relationship of this approach to recent developments in non-rigid image registration.

The present invention uses an alternative approach to elastographic imaging using finite elements, image similarity, and a Newton-Raphson based reconstruction algorithm. By casting the elastographic inverse problem within the context of image similarity, issues commensurate with any particular method of displacement measurement are overcome; hence, the realization of a modality independent elastography (MIE) method. The results clearly indicate that non-visible stiff anomalies that exist within the imaging domain may be discernable by this technique.

The discretization shown in FIGS. 2A-2D is under-resolved and investigations into multi-grid techniques or mixed-interpolative approaches to the problem formulation is desirable. It is also desirable to determine the level of image heterogeneity needed for successful reconstructions, i.e., purely homogeneous intensity images cause this framework to fail. Another aspect concerns the determination of the proper RMI parameter settings. Results not presented here have shown varying quality in image reconstructions based on the size of the RMI kernel. Utilizing other methods of image similarity are also contemplated in the present invention.

This approach to elastography is not focused on refining techniques to directly measure displacement as in Ultrasound and MR elastography (for review of current USE and MRE techniques, see June issue of Physics in Medicine and Biology) but rather uses image similarity to drive the material parameter reconstruction. The advantages of this technique are its low-cost, ease of integration, and its potential ability to be used across several modalities (US/CT/MR). While image correlation has been used as a way to measure displacement within US images, i.e., displacement measurement by speckle tracking, the unique aspect of this approach is that the elasticity image reconstruction is solely a function of image similarity and does not require the added processing step of constructing displacement fields from RF/MR data. More specifically, the technique as presented here should not be confused with speckle tracking since changes in intensity due to anatomical structure are the driving image similarity characteristics. Others have suggested that elastography reconstruction methods may be based on analyzing image patterns. However, these techniques have been largely focused on using MR tagging. The approach disclosed herein does not require special image sequences; rather, it may only require a second set of diagnostic images acquired under a prescribed deformation source. Furthermore, elasticity image reconstructions are considered here as a non-rigid image registration problem whereby elasticity values become the controlling parameters. Results from idealized numerical simulations demonstrate the encoding of elasticity within a locally-defined image similarity measure, the framework of the elasticity imaging algorithm, elasticity reconstructions, and some interesting observations that suggest the level of image intensity heterogeneity within the imaging object is a desirable parameter for successful application of this method.

Regional image similarity is used as a vehicle for guiding mechanical property updates in an FEM elasticity image reconstruction framework. Fortunately, over the past decade, there has been a marked interest in applying similarity criteria to medical imaging. One particular method that has found widespread appeal is mutual information (MI) which has its origin in information theory and was proposed independently.

Central to MI is the Shannon entropy, H, which relates to the average information supplied by a given set of parameters, s, whose probabilities are given by P(s). The expression for the Shannon entropy with respect to a discrete parameter probability is, $$H = -\sum_i P(s_i) \log(P(s_i)). \tag{7}$$

By characterizing two images using the probability distribution function (PDF) based on the joint histogram and recognizing that minimizing the joint entropy correlates with better image-to-image alignment, a powerful method to iteratively register images is created. With the realization that equation (7) is rewritten with respect to the PDF of the image set, MI is defined as, $$M(I_1,I_2)=H(I_1)+H(I_2)-H(I_1,I_2) \tag{8}$$

where $I_1, I_2$ are two images in which the mutual information is desired and $H(I_1,I_2)$ is the joint entropy of both images. It has also been shown to be advantageous to normalize the mutual information to enhance algorithm performance. One such extension is, $$M(I_1, I_2) = \frac{H(I_1) + H(I_2)}{H(I_1, I_2)} \tag{9}$$

and is often referred to as normalized mutual information (NMI). Mutual information has been used widely for the registration of multi-modality image sets. This parameterization has also been used in various non-rigid registration problems to include those using elastic matching and specifically non-rigid registration of the breast. Additionally, reports of using MI for ultrasound images are becoming more common. As an initial measure, normalized MI, equation (9), seems a logical starting point for image comparison and the work presented above follows the progression as reported by Fitzpatrick, Maurer, and Hill.

One step remains to complete a method for reconstructing the material properties of soft tissue. For registration applications, normalized MI is a single metric to be maximized with respect to registration parameters (three parameters in 2-dimensional image registration: position (x,y) and orientation, θ). This limited parameter set size allows for traditional optimization frameworks to be relatively well behaved. However, within an elasiticty image reconstruction application, several hundred parameters may be needed to adequately describe the spatial distribution of mechanical properties. As a result, the image comparison domain has been discretized into localized regions of similarity. This normalized regional mutual information (RMI) metric is used to spatially parameterize the similarity between image sets. More simply, whereas in conventional MR and Ultrasound elastography, the measurements of displacement are used within the minimization of an objective function, in this method, a regionally defined similarity criterion will serve the same role. The number of similarity regions will dictate the grid resolution of the elasticity image reconstruction (i.e., for N property parameters distributed spatially, at least N similarity measures must be provided to establish determinacy). It follows that the resolution limit of this process inherently depends on the number of pixels within the deformed geometry and subsequently the pixel area of the RMI neighborhoods.

Although disclosed herein as a simulation, the clinical application may begin with the acquisition of two image volumes. The first image volume is a baseline acquisition referred to as the "source" and will have two primary uses: (1) model-generation and (2) as the source image for prediction (i.e., as model calculations are made, the deformations will be applied to this image and deformed accordingly). The second image volume referred to as the target will consist of the breast in its deformed state and will be used to determine boundary conditions and for image similarity comparison. The reconstruction framework will be designed to vary model material properties until the deformed source image matches the target image. For this work, a linear elastic model of the breast with assumptions of plane strain and Hooke's Law will be used to reflect the deformation behavior of the breast when subjected to compression and is written as, $$\nabla \bullet \sigma = 0 \tag{10}$$

where $\sigma$ is the mechanical stress tensor. Hooke's Law assumes that the deformation behavior is characterized by two material properties: E and v, Young's modulus (object of parameter reconstruction) and Poisson's ratio, respectively (assumed constant at v=0.45). In the case of quasi-static loading, results from the MR and US elastographic literature have shown encouraging results when using two-dimensional approximations, thus adding credence to its use here. To solve the ensuing system of equations associated with a finite element (FE) formulation of the problem, a standard Galerkin weighted residual approach was used with Lagrange polynomial basis/weighting functions. The deforming of the source image is accomplished by applying the FE-calculated displacements to the source image volume and using the natural Lagrange interpolant polynomials to determine correspondence between un-deformed and deformed pixels.

The mechanics of the inverse problem rely on the minimization of an objective function, G(E), defined as the square of an image similarity residual, $$G(E) = \sum_{i=1}^{M} (S(E_T)_i - S(E)_i)^2 \tag{11}$$

where $S(E_T)_i$ is the $i^{th}$ maximum similarity index (i.e., similarity measure between target image and itself) and $S(E)_i$ is the $i^{th}$ member of M similarity measurements between model-deformed source image and target image. To minimize equation (11), the derivative with respect to the material distribution, E (array of N desired material properties), must be calculated and set to zero $$\frac{\partial G}{\partial E} = -2(S(E_T) - S(E))\frac{\partial S(E)}{\partial E} = 0 \tag{12, 13}$$
$$J^T(S(E_T) - S(E)) = 0$$

where $$J = \frac{\partial S(E)}{\partial E}$$

is the material Jacobian matrix (M×N matrix). Using a Newton-Raphson based approach to solve equation (13), the following is written:

$$E_{k+1} = E_k + \frac{J^T(S(E_T) - S(E))}{J^T J}. \tag{14}$$

In many other methodologies that use a similar non-linear iterative-based algorithm, the Jacobian matrix is usually $$J = \frac{\partial \bar{u}^c}{\partial E}$$

where $\bar{u}^c$ would be the calculated displacements. This marks a fundamental shift away from direct measurement/comparison of displacement within the reconstruction algorithm. Of course, this simplification does come at a computational cost in that the Jacobian as defined in equations (12, 13, 14) must be calculated numerically, i.e., secant estimate of derivative. To solve the non-square system of equations in (14), the property update is calculated from the expression, $$(J^T J + \alpha I)\Delta E = J^T(S(E_t) - S(E)) \tag{15}$$

where $\alpha$ is a matrix regularization parameter associated with a standard Levenberg-Marquardt approach and I is the identity matrix. As is typical of inverse problems, the Hessian matrix, $H = [J^T J]$ (an N×N matrix), is usually ill-conditioned and regularization techniques are required to allow the material property update. With equation (15), the framework is provided for iteratively updating the material properties within the scanning region. Another often useful numerical operation is to perform spatial averaging either between iterates or at some interval to enhance numerical stability. The method used in the simulated reconstructions is similar to that presented by Doyley et al. and is designated here, $$\hat{E}_{k+1} = \theta E_{k+1} + (1 - \theta)\frac{\sum_{i=1}^{m} E_{k+1,i}}{m} \tag{16}$$

where $E_{k+1}$ is the material property update provided by solving equation (15), i is the $i^{th}$ node of a set of m connecting nodes (nodal as opposed to elemental description of properties is employed in the algorithm), and $\theta$ is the weighting between the update and its nodal average ($\theta = 0.75$ for reconstructions).

Figure 7:
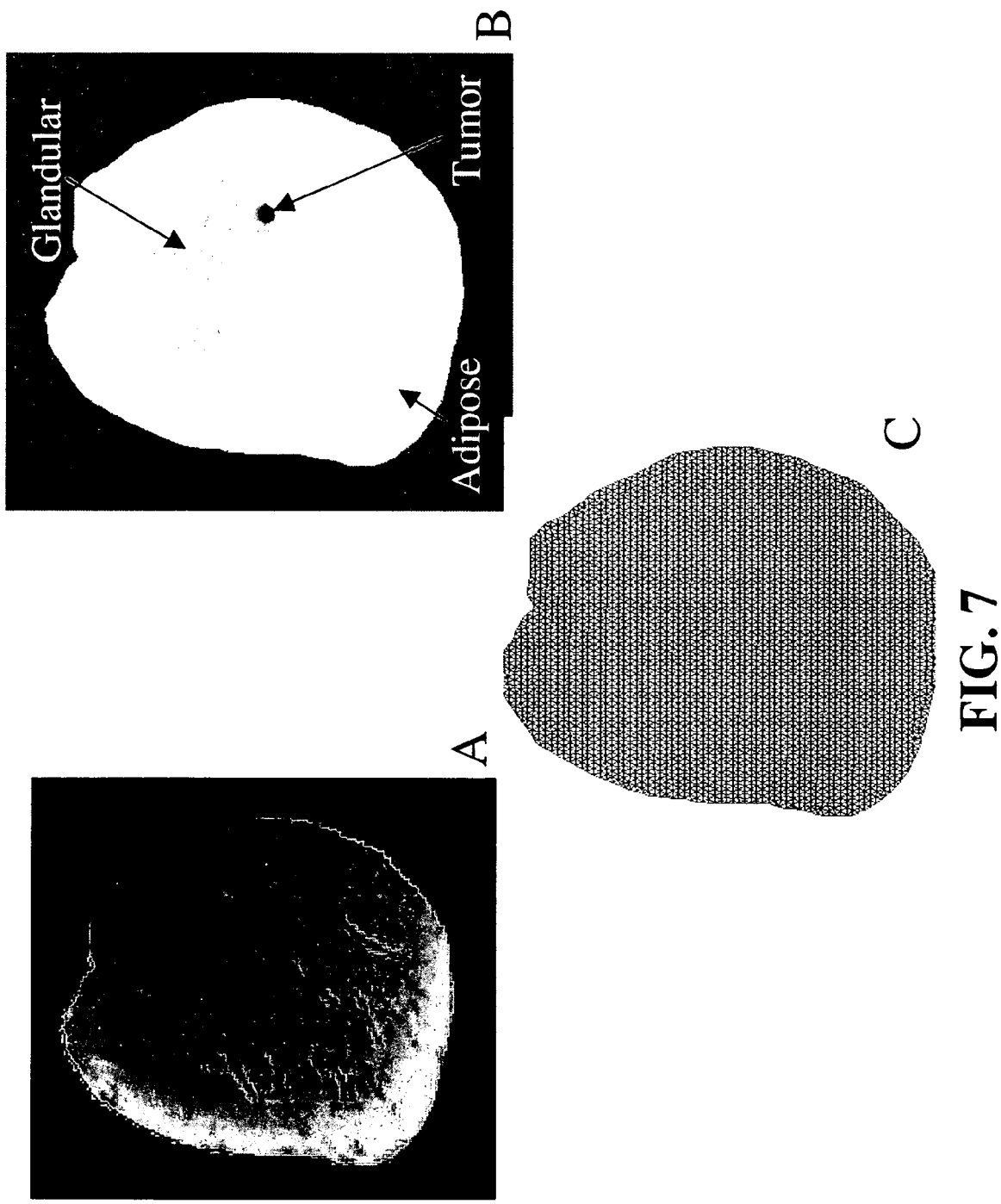
FIG. 7A shows a frontal cross-sectional MR slice of breast tissue.
FIG. 7B shows a computational domain of the MR slice of FIG. 7A showing patient-specific material property heterogeneity pattern.
FIG. 7C shows an underlying high resolution triangular grid used for finite element computations.
Figure 8:
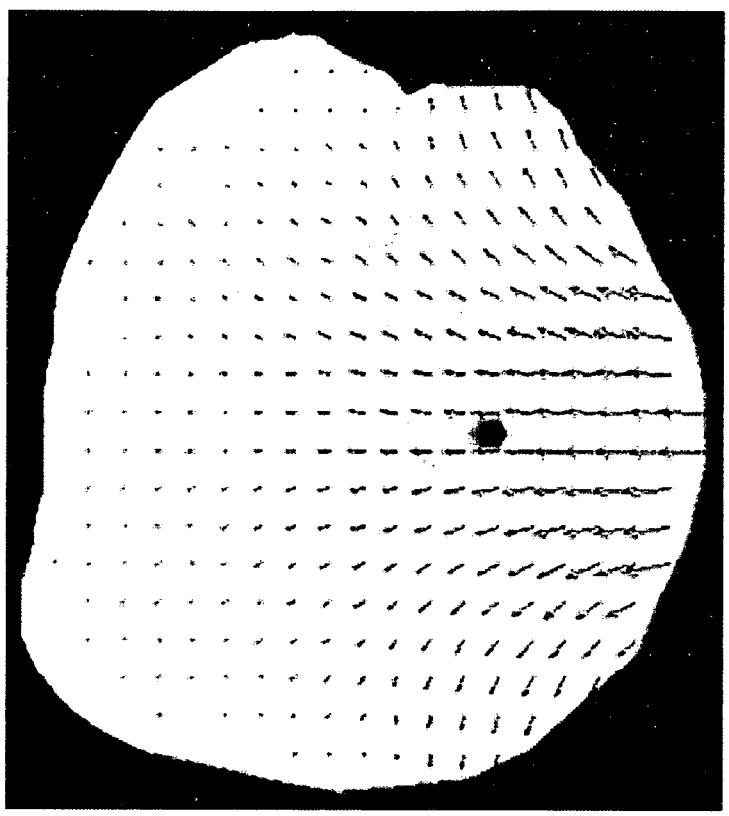
FIG. 8A shows displacement vectors obtained from a model-based deformation calculated using the finite element method and is shown overlaying the computational domain.
FIG. 8B shows the deformed MR image based on model displacements of the model-based deformation calculation of FIG. 8A.
Figure 8:
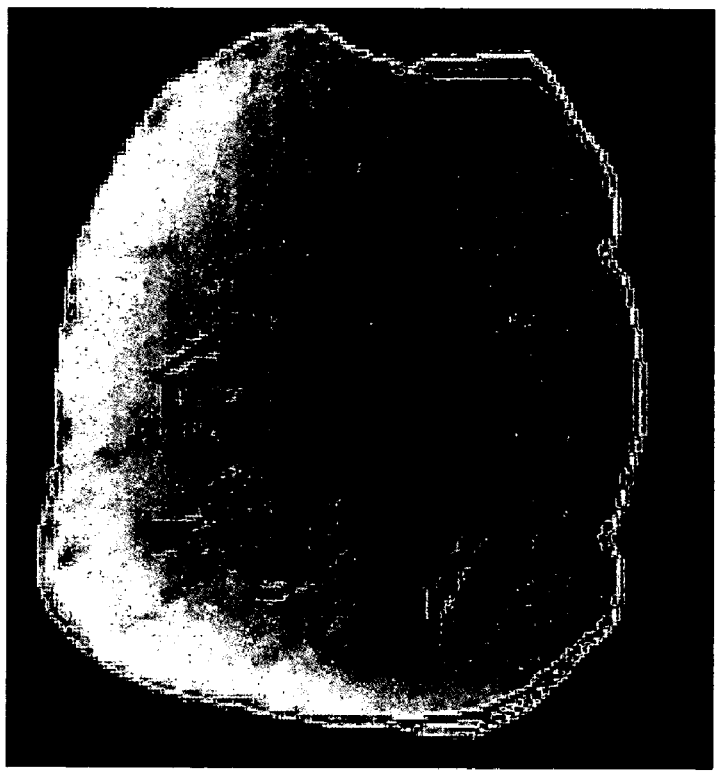

To appreciate this image similarity based elastography method, an exemplary computational analysis on an MR breast image slice is performed. In this analysis, the cross-sectional frontal MR slice from a breast shown in FIG. 7A is used with the material property description shown in FIG. 7B on the computational grid shown in FIG. 7C. The 5 mm dark region is introduced with an elastic modulus of 106 kPa corresponding to experiments performed by Krouskop et al. that measured the elastic properties of an invasive infiltrating ductal carcinoma. Other moduli from Krouskop et al.'s experiments for adipose and glandular tissue (18 kPa and 28 kPa respectively) were also reported and used in this model. By applying boundary conditions that simulate a lateral compression, specifically displacement boundary conditions, the resulting finite element model calculation using plane strain linear elastic approximations in two-dimensions is shown in FIG. 8A with the corresponding model-deformed image shown in FIG. 8B. Note that in FIGS. 7A and 8B, there is no distinct intensity demarcation of the tumor within the image. The only data indicating the presence of the tumor would be encoded in the displacements of FIG. 8A and in the corresponding deformed intensity pattern in FIG. 8B. These calculations/deformed-images were then repeated with varying stiffness values for the ductal carcinoma and compared to the true image (i.e., the target image generated using 106 kPa in FIG. 8B) via their joint histogram and with respect to their regional mutual information kernel values. The term "kernel" refers to pixel area in which NMI is being calculated. The four values used for the tumor properties in generating the comparison images were 18 kPa, 36 kPa, 72 kPa, and 98 kPa (i.e., 1:1, 2:1, 4:1, and a 5.5:1 ratio of tumor-to-adipose tissue stiffness contrast).

Figure 9:
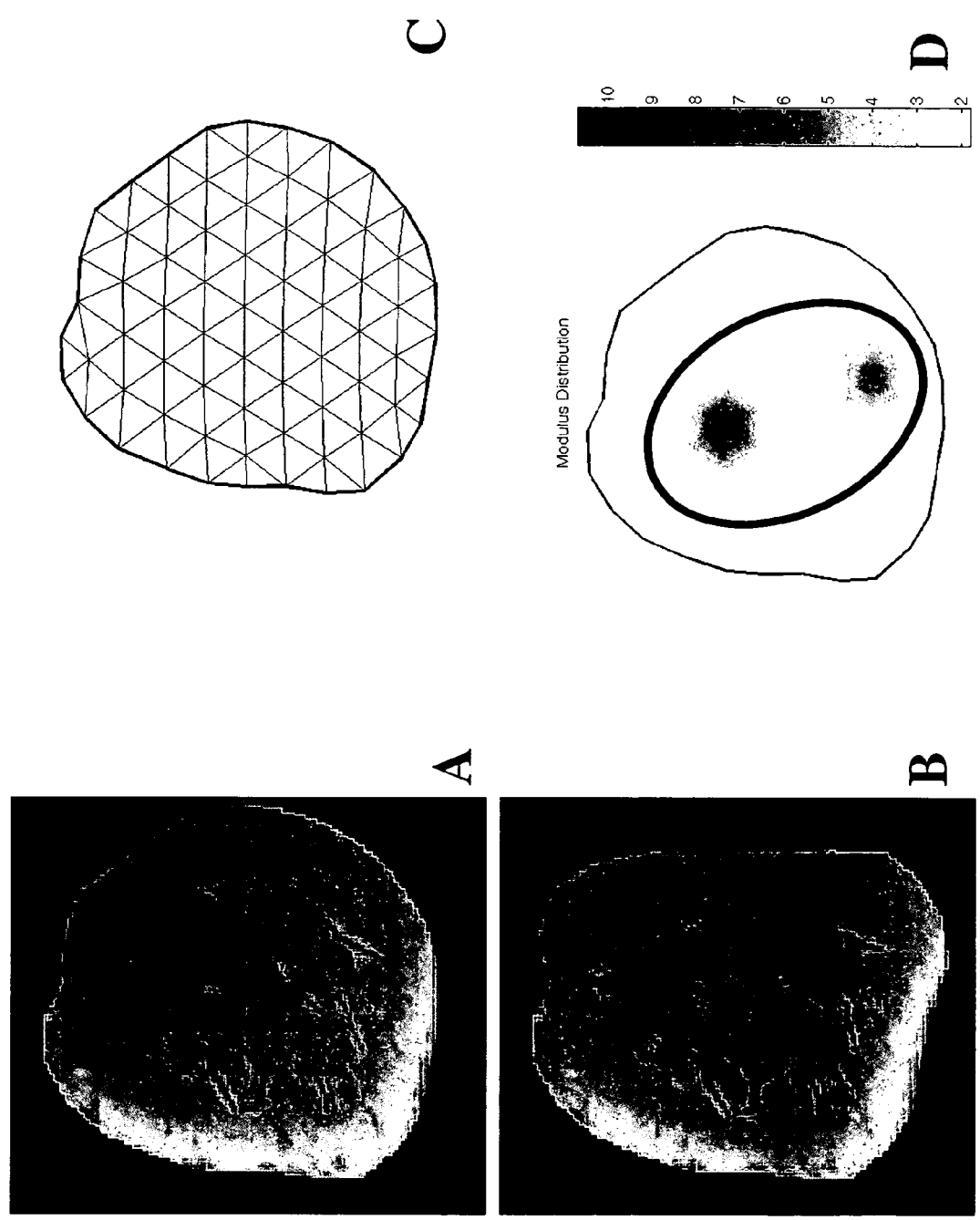
FIG. 9A shows a breast slice used for model formation.
FIG. 9B shows a compressed target image.
FIG. 9C shows a discretized finite element domain.
FIG. 9D shows a displayed target modulus distribution (grayscale colorbar—×$10^4$ Pascals) to be used in an idealized elasticity image reconstruction simulation.
Figure 10:
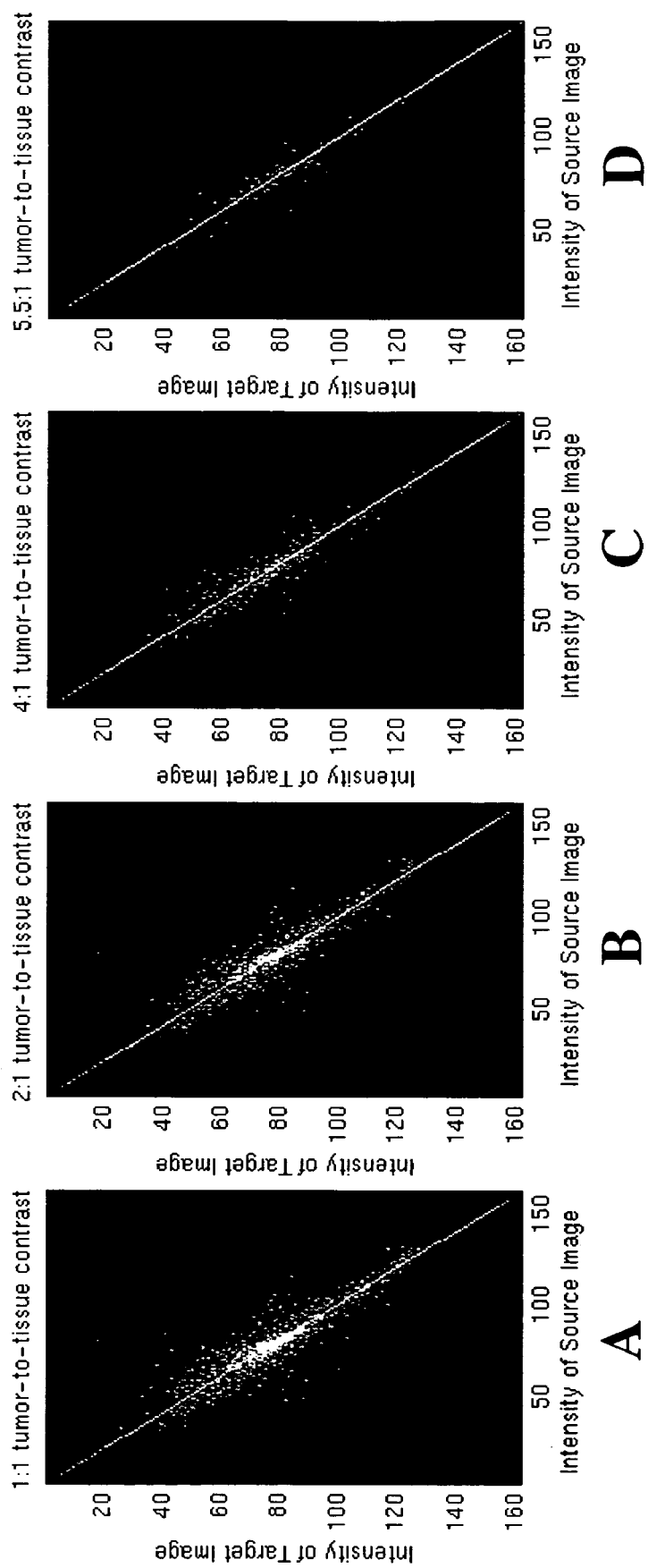
FIGS. 10A, 10B, 10C and 10D show joint histograms between a model-deformed target image (6:1 tumor-to adipose tissue stiffness contrast) and respective deformed source images with tumor-to-adipose tissue stiffness contrasts (1:1, 2:1, 4:1, and 5:5:1 tumor-to-adipose tissue contrasts, respectively)
Figure 11:
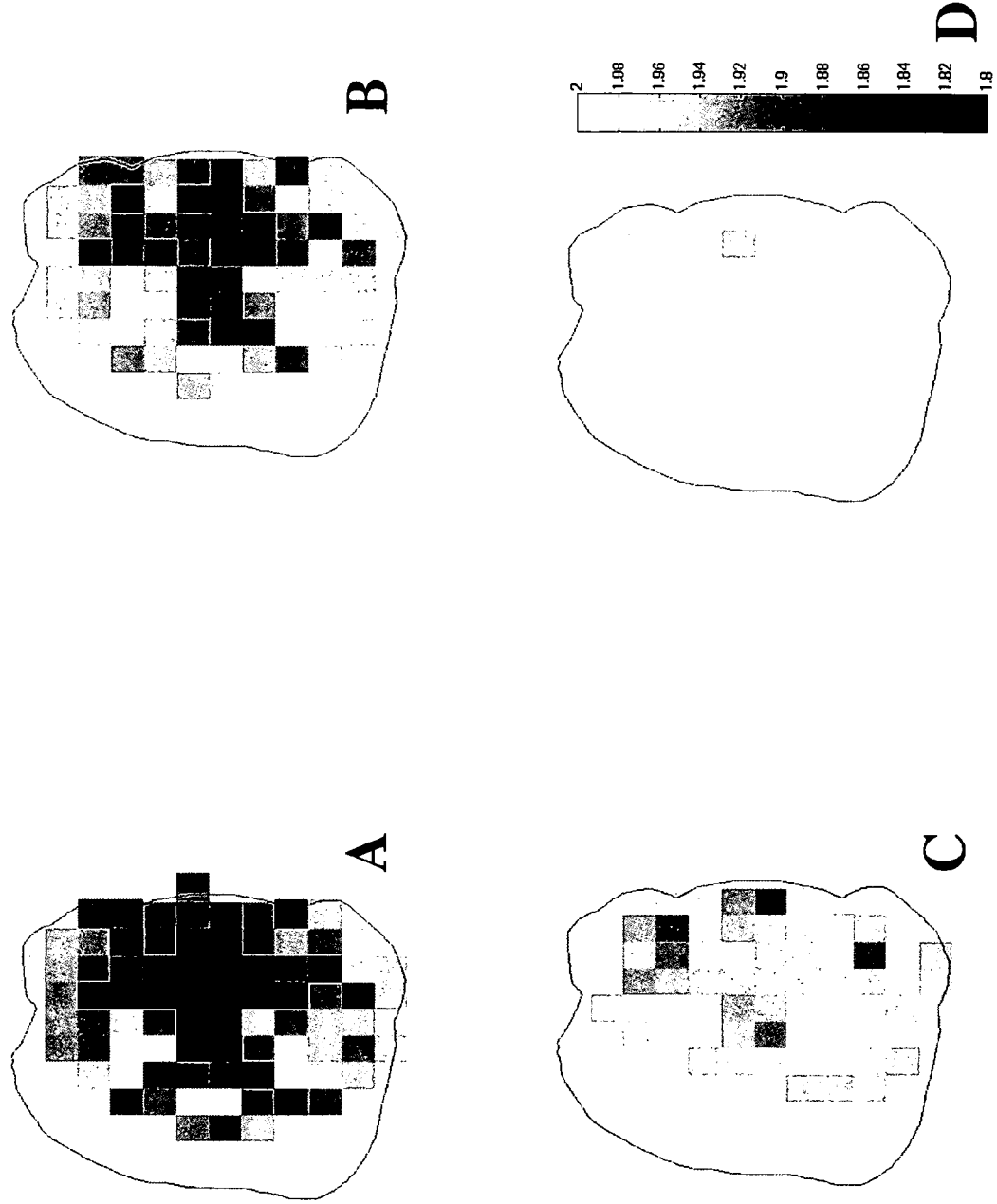
FIGS. 11A, 11B, 11C and 11D show regional mutual information between a 6:1 tumor-to adipose tissue stiffness contrast target image with respective deformed source images (1:1, 2:1, 4:1, and 5:5:1 tumor-to-adipose tissue contrasts, respectively)

To test the elasticity image reconstruction algorithm represented by the solution of equation (15) and the parameter processing of equation (16), an idealized stiffness parameter reconstruction simulation is presented with a reduced discretization level for feasibility demonstration purposes. FIGS. 9A-9D illustrate the simulation setup where the computational domain consists of a total of 71 material property parameters (Young's Modulus). FIGS. 9A and 9B demonstrate the effects of breast compression by simulated displacement boundary conditions. The boundary conditions laterally compress the breast from the right while rigid boundary conditions hold the breast fixed left of the midline (notice bulging at breast superior/inferior boundary right of midline and lack of boundary movement left of midline). FIG. 9C shows the discretized finite element domain with FIG. 9D quantifying the desired modulus distribution used in generating the compressed image in FIG. 9B. With respect to the reconstruction, a property subregion containing twenty-eight stiffness parameters is designated for the focus of the material property update and is shown in FIG. 9D by the black circle (i.e., properties outside the region were considered to be adipose and of a known stiffness). The highest material modulus value shown corresponds to that of an invasive ductal carcinoma (106 kPa) while the mid-level stiffness corresponds to that of fibrous tissue (72 kPa) with a general background corresponding to that of normal adipose tissue (18 kPa).

FIGS. 10A-10D illustrate the joint histogram where each sub-image represents the comparison between the target image containing the 6:1 tumor-to-adipose tissue stiffness contrast (FIG. 8B) and the source image with varying levels of tumor-to-adipose tissue stiffness contrast (i.e., 1:1, 2:1, 4:1, and 5.5:1, respectively). FIGS. 10A-10D show that as the stiffness contrast approaches that of the target image (6:1 ratio), the joint histogram spread becomes increasingly less (a perfect match would produce a straight line). The results in FIGS. 10A-10D are consistent with observations in the registration literature. Thus in some sense, the elastography method proposed within this work represents a non-rigid iterative registration algorithm that varies material property values within a model to improve registration.

However, one step remains to enable the observations in FIGS. 10A-10D to precipitate the framework for an elasticity parameter reconstruction scheme. FIGS. 11A-11D illustrate the RMI metric in reference to the histograms of FIGS. 10A-10D. Interestingly, the RMI distribution is not tightly localized on the tumor but rather the resulting dissimilarity between images is quite diffuse. This would suggest that widespread changes in the anatomically-based heterogeneous image intensity pattern are reflected by modest variations (in size) in the material property distribution; thereby, the values in FIGS. 11A-11D become indirect measurements of stiffness property deviations (note that in FIGS. 11A-11D, comparing the 6:1 image to itself would yield a completely white image). Further, it demonstrates that as the tumor stiffness approaches the correct value used in FIG. 8B (i.e., 106 kPa), an increase in mutual information between the image pairs exists (i.e., the RMI image gets progressively lighter). It is this similarity behavior that will be at the core of the elasticity image reconstruction technique.

Figure 12:
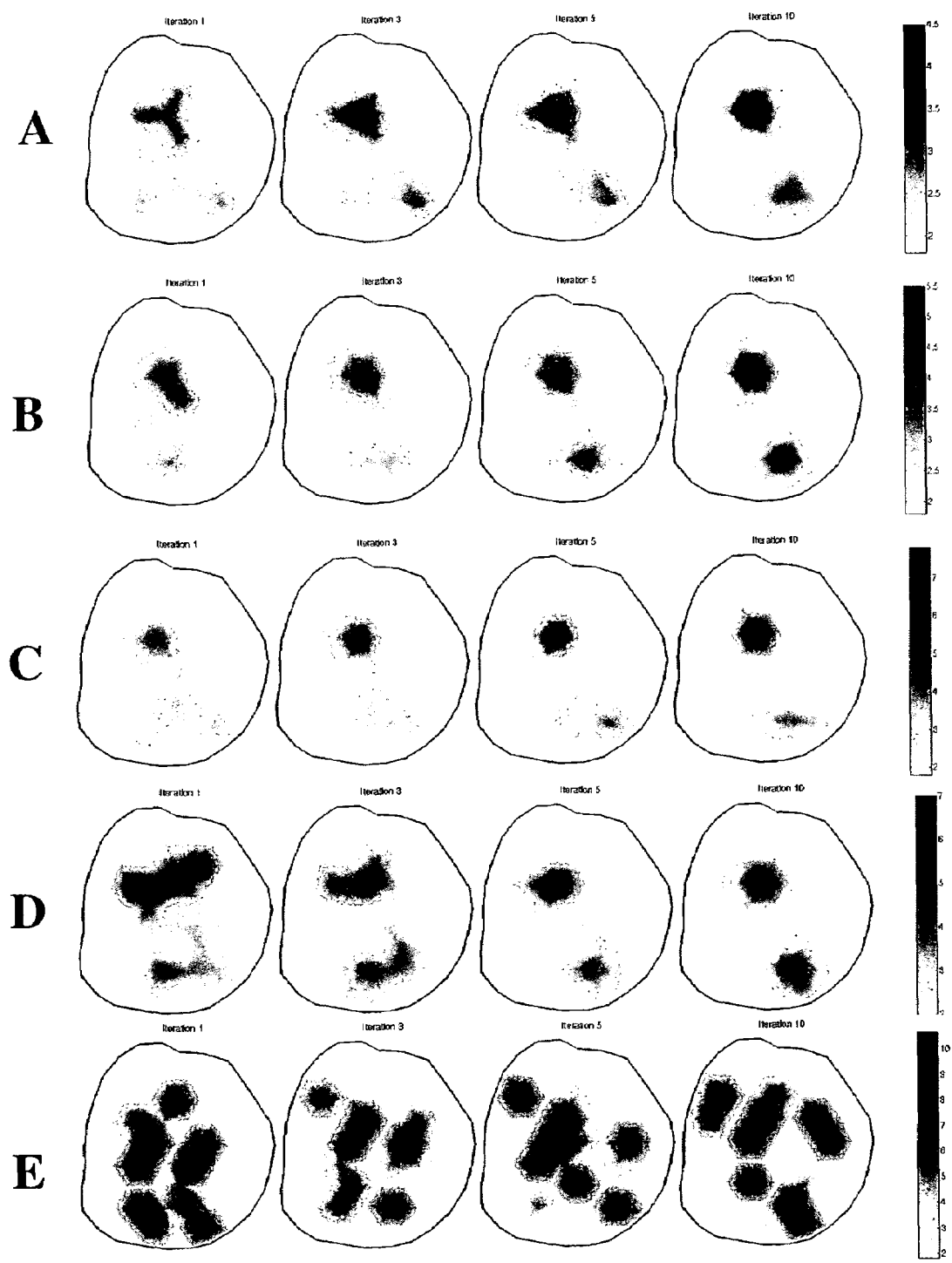
FIGS. 12A, 12B, 12C, 12D and 12E show elasticity image reconstructions with RMI kernel sizes of 35 pixel$^2$ (FIG. 12A), 63 pixel$^2$ (FIG. 12B), 130 pixel$^2$ (FIG. 12C), 204 pixel$^2$ (FIG. 12D), and 352 pixel$^2$ (FIG. 12E) (grayscale colorbar—×$10^4$ Pascals)

FIGS. 12A-12E show first, third, fifth and tenth iterations of the reconstruction implemented by the algorithm in accordance with the present invention. Each row corresponds to a different regional MI kernel size. Overall, for the first four RMI kernel sizes (FIGS. 12A-12D), a relatively good localization of the target modulus description from FIG. 9D has been achieved. Interestingly, the dynamics of the reconstructions do vary with kernel size and there is a reconstruction limit with respect to this specific heterogeneity pattern as shown in FIG. 12E where the reconstruction has failed with a 352 pixel$^2$ kernel area which corresponds to a total of 36 RMI regions being evaluated per iteration. Although the peak elasticity values vary substantially across reconstructions, some intuition is gained by realizing the process associated with spatial averaging in equation (16). Using $\theta=0.75$, the largest possible reconstructed modulus value for the high contrast region is 87 kPa (that is, the process of spatial averaging reduces the theoretical limit by 18%). The 10$^{th}$ iteration in FIG. 12C has a peak value approximately 10% lower than this theoretical limit. This result is encouraging but the varied performance with other RMI kernel sizes needs to be studied further.

Figure 13:
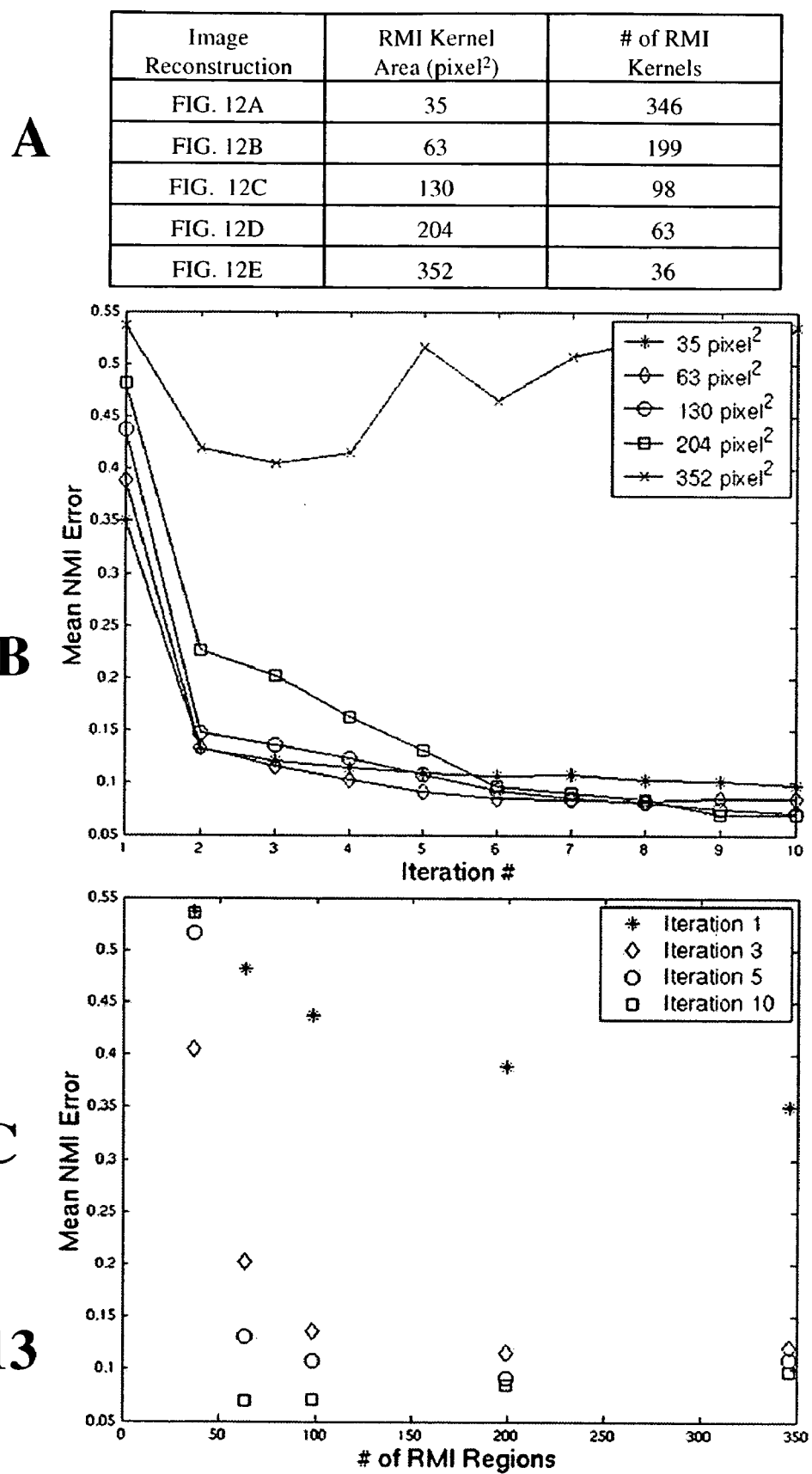
FIG. 13A shows tabulated kernel size and number of RMI kernel measurements used for each elastographic image in FIGS. 12A-12E.
FIG. 13B shows mean NMI error for each iteration in FIGS. 12A-12E with respect to each RMI kernel size.
FIG. 13C shows mean NMI error versus the number of RMI regions at each iteration in FIGS. 12A-12E.

A preliminary analysis studying the influence of RMI kernel size on the reconstruction process is presented in FIGS. 13A-13C and relates the effects of RMI kernel size to the mean error in NMI-based elasticity image reconstruction $$(\overline{NMI}_{error} = \frac{1}{N}\sum_{i=1}^{N}|(S(E_T)_i - S(E)_i)|,$$

where N is the number of kernels). FIG. 13B displays the mean NMI error for each iteration with respect to each kernel size. As shown in FIG. 13B, a general trend is seen in the error reduction for the first four kernel sizes, with a clear indication in the last case of a failed reconstruction. Interestingly, at the 204 pixel$^2$ reconstruction (63 RMI regions) a more modest improvement in the error is seen in the early iterations. Another revealing way to look at the data is shown in FIG. 13C. Here the mean NMI error is plotted against the number of RMI regions used for each iteration. From these data, a minimum number of image measurements for a feasible elasticity image reconstruction is observed and corresponds to approximately twice the number of elastic parameters, (approximately 63 RMI kernels for 27 unknown elastic parameters). It is also interesting to notice that the best reconstruction does not necessarily correspond to the maximum number of RMI measurements.

A method has been presented which uses local measures of normalized mutual information and finite elements to reconstruct elastic properties of breast tissue. Although presented here only in the context of MR images, the method is solely driven by a general image similarity measure and as such may be applied to any other modality provided the intensity data is sufficiently heterogeneous and does not significantly vary from a pre- to a post-deformed state (i.e., there is a unique mapping of gray scale values from source to target). It should also be noted that this constraint on image intensity variance does not refer to the correlation of speckle but rather requires the intensity signature due to anatomical structures to remain present from the pre- to the post-deformed state. In the work presented here, MI was the method chosen to reflect changes in the image pattern; however, other similarity criteria may be employed.

The computational results presented in FIGS. 7A-7C, 8A, 8B 10A-10D and 11A-11D demonstrate that MI can parameterize material property changes and that changes in image pattern due to modest lesion sizes is quite diffuse. In FIGS. 12A-12E, an idealized stiffness parameter reconstruction using realistic material property values has been achieved to demonstrate the feasibility of this approach. The variability in material parameter reconstruction for five different RMI kernel sizes is shown and indicates that a kernel size threshold exists where failure ensues for this particular image set. In addition to highlighting this threshold, FIGS. 13A-13C also illustrate interesting behavior when approaching the threshold whereby early iterates in the reconstruction process are not as productive for an RMI kernel size that is close to the threshold. Also, increasing the number of RMI regions does not necessarily result in better elasticity images (at least with respect to the mean NMI error and peak elasticity values in FIGS. 12A-12E). This is likely due to a fundamental limit whereby finer RMI sampling of the pattern results in non-unique information being added to the reconstruction suggesting that the degree of intensity heterogeneity has a role in determining spatial resolution of the elasticity image reconstruction.

This RMI kernel size threshold will have significant implications in further developing this framework. Undoubtedly, in an image that is completely homogeneous in intensity, this method would fail. Further work investigating this link between the general degree of image intensity heterogeneity and the extent of parameter reconstruction must be understood to develop criteria to guide the application of this method. In addition, this investigation must be conducted within the scope of varying image types to better understand and classify the limitations with respect to imaging modality.

The results demonstrate that the approach is thought of as a registration between a deformed image series acquired by some imaging method, such as MR, CT, optical, etc., and a model-deformed image series. As presented here, the method does not require the reconstruction of tissue displacements within the domain. However, this may be performed and used within conventional model-based reconstruction techniques. The advantage to this alternative development path would be the analytic determination of the Jacobian term $$\left(\text{i.e., } J = \frac{\partial \bar{u}^c}{\partial E}\right).$$

The disadvantage, which may be minor, is that the approach would rely considerably upon non-rigid registration methods for the determination of displacements from the pre-post deformed imaging data.

In either developmental pathway, there are other concerns regarding the presented simulations that need to be addressed such as the degree of mesh convergence (i.e., calculations made must be independent of mesh resolution) and the elasticity image resolution. The elasticity image reconstructions are based on a coarse spatial description of mechanical properties (see FIGS. 9C and 9D). In addition, the reconstruction region has been further limited to a specific subregion of the property set. The level of discretization may be improved using a multi-grid approach to ensure proper mesh convergence. This numerical technique produces discretization independent calculations with stiffness parameter reconstructions of a lower resolution. It should also be noted that the problem setup described in FIGS. 9A-9D is more consistent with using the method as a diagnostic indicator as opposed to a detection method. More specifically, this approach may be used to classify tissue stiffness values in suspicious regions as observed by traditional imaging modalities or to reconstruct the stiffness property of a spatially defined anomaly using all available anatomical image data.

An alternative approach to elastographic imaging using finite elements, image similarity, and a Newton-Raphson based reconstruction algorithm is presented. The development and results suggest that the deformation behavior associated with a specific tissue stiffness distribution is encoded within the dynamics of anatomical heterogeneous intensity patterns that are associated within a traditional imaging modality. By reformulating the inverse problem in this manner, the technique departs from elastography methods based on direct displacement measurement to an approach more closely related to the recent advances in non-rigid image-registration. Given the considerable success of mutual information in multi-modality image registration, it is asserted that this elastographic approach may be applied to other imaging modalities hence creating a modality-independent elastography. The caveat to this exciting perspective is that the results herein indicate a convergence dependency on the degree of image intensity heterogeneity and RMI kernel size.

A multi-grid approach and the parallel implementation of the algorithm may also be implemented in accordance with the present invention. In addition, different image similarity methods may be utilized without departing from the present invention. Phantom experiments have been conducted to illustrate the method's independence of imaging modality by reconstructing elasticity images of the same phantom in two different imaging modalities, namely magnetic resonance (MR) and computed tomography (CT). Performing elastography using CT images will likely create new areas of soft tissue interrogation that are more amenable to the CT imaging platform.

To quantify the similarity between a model-deformed source image and the acquired target image, metrics are utilized that originate from a vast body of research of which, a significant portion have been utilized for medical image-processing. These metrics have formed the basis for what is known as intensity-based registration methods, where intensity refers to the scalar values associated with image pixels in an image. Rather than using points or surface features, intensity-based methods attempt to optimize the "similarity" between images. Determining how to measure this "similarity" has been, and continues to be, the focus of numerous studies. Four commonly used similarity metrics are disclosed herein, however the present invention is not limited to these similarity metrics. Normalized mutual information (NMI) similarity is described above. Other similarity metrics include sum of squared differences (SSD), correlation coefficient (CC) and gradient correlation (GC).

The sum of squared differences (SSD) is a common method to compare images and would be another choice for driving the reconstruction. SSD is defined as, $$SSD = \frac{1}{N}\sum_{i=1}^{N}|I_1(i) - I_2(i)|^2 \quad \forall \in I_1 \cap I_2 \qquad (17)$$

where the sum operates on N pixels.

Another metric that is simple is the correlation coefficient (CC). CC assumes that the intensity from $I_1$ is linearly related to those of $I_2$, and when this is true CC has been shown to be an excellent measure of image similarity. Also, this is not an unreasonable assumption given that in it is current form, MIE is considering intra-modality images. CC can be calculated by the following expression, $$CC = \frac{\sum_{i=1}^{N}(I_1(i)-\bar{I}_1)(I_2(i)-\bar{I}_2)}{\sqrt{\sum_{1}^{N}(I_1(i)-\bar{I}_1)^2 \sum_{1}^{N}(I_2(i)-\bar{I}_2)^2}} \quad \forall \in I_1 \cap I_2 \tag{18}$$

where $\bar{I}_1$, $\bar{I}_2$ are the mean pixel values of images $I_1, I_2$, respectively.

Yet another metric is gradient correlation (GC). GC differs from the above measures most significantly in that GC operates on the gradient of the two images. More specifically, GC is a similarity method that is sensitive to the edges found within the two images. Calculation of GC is performed by first filtering the two images with the Sobel template in orthogonal directions (x, y). This produces gradient images with respect to x, $\partial I_1/\partial x$ and $\partial I_2/\partial x$, and gradient images with respect to y, $\partial I_1/\partial y$ and $\partial I_2/\partial y$. The CC is then calculated using equation (18) between gradient images $\partial I_1/\partial x$ and $\partial I_2/\partial x$, and separately between gradient images, $\partial I_1/\partial y$ and $\partial I_2/\partial y$. GC is the average of these two values.

Figure 14:
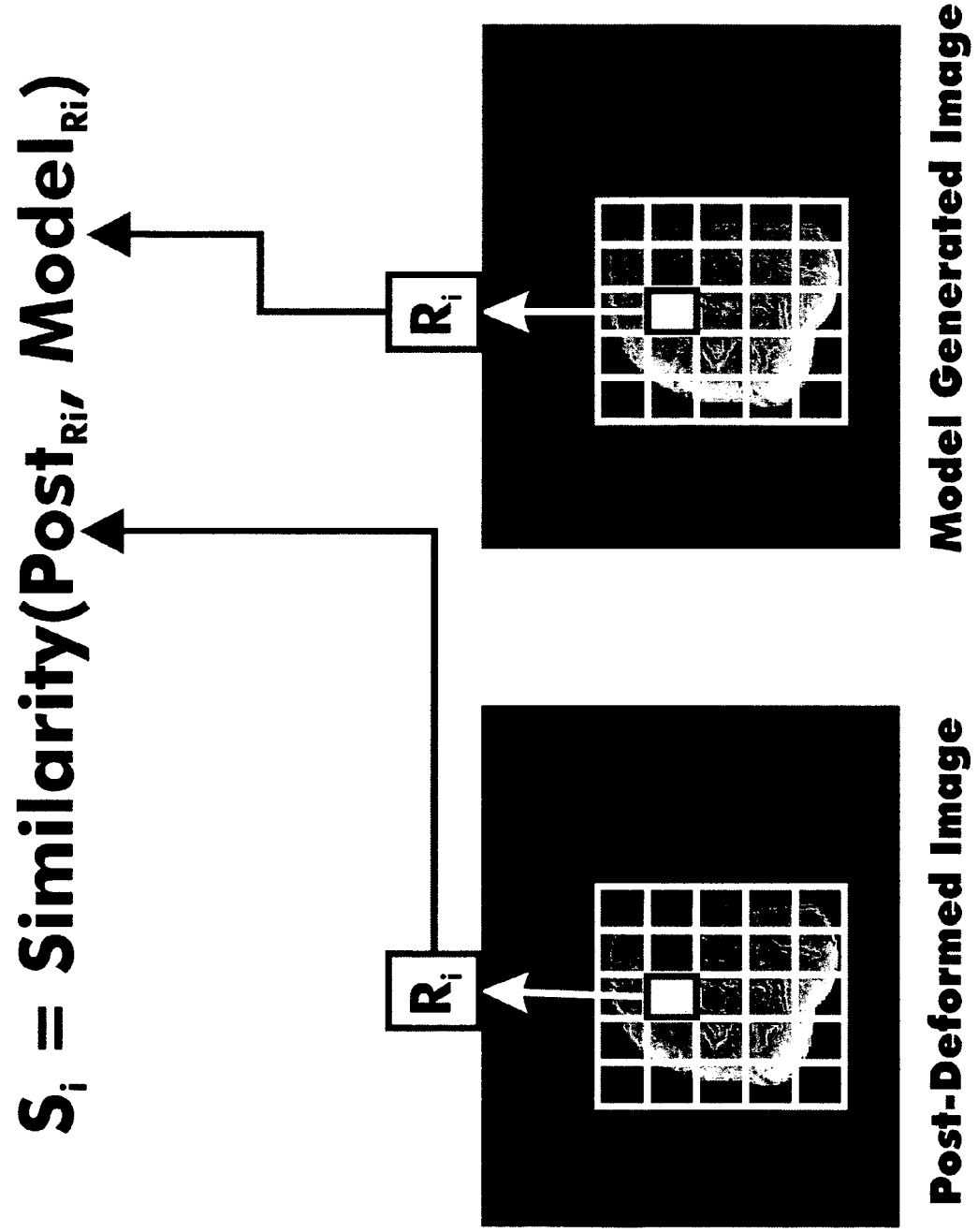
FIG. 14 is a graphical representation of a post-deformed image and a model generated image for determination of a similarity measurement in accordance with the present invention.

Generally within intensity-based image registration frameworks, image similarity is considered as a global metric. However, in order to reconstruct a spatial distribution of material properties, using more than one measurement is preferred, and therefore, a regional evaluation approach to calculating similarity is preferably implemented. A sketch of this process is represented in FIG. 14. FIG. 14 is a graphical representation of a post-deformed image and a model generated image for determination of a similarity measurement which is consistent with the present invention. The process is initiated by first defining a bounding region overlaying all tissue in the deformed image. Areas of the images outside of the bounding region do not influence tissue properties and as such are neglected. After the bounding box is defined, it is further discretized into the regions that will be used in calculating similarity. This discretization is determined by defining a user-prescribed characteristic length for the size of individual regions. Such a characteristic length directly dictates the number of pixels sampled for each regional similarity measurement. Within the current framework, all similarity measurements are sampled within the tissue and the tissue/air boundary information is preferably, although not necessarily, excluded. Once the regions are defined, the similarity metric is calculated between corresponding regions of the post-deformed target image and the model-generated deformed source image. It is these regional image similarity measures that will drive the material property updates. Ultimately, the number of regions will dictate the grid resolution of the material property distribution in the elasticity image; therefore, the resolution limit to this process inherently depends on the number of pixels within the deformed geometry and the texture contained within that image information.

The mathematics of the inverse problem rely on minimization of a least squared difference objective function based on image similarity:

$$\Phi(E) = \sum_{i=1}^{M}(S(E_T)_i - S(E_E)_i)^2 \tag{19}$$

where $S(E_T)$ is the similarity between regions of the deformed source and target images given the true Young's modulus, $E_T$, (i.e. similarity between the target image and itself assuming no significant image noise between source and target image acquisition); $S(E_E)$ is the similarity between the deformed source and target images whereby the deformed source image has been generated using the current estimated Young's modulus values, $E_E$; and, M is the number of similarity measurement regions. To minimize, the derivative with respect to the unknown property distribution, $E_E$, is taken and set to zero which generates the following series of N functions, $f_i$:

$$f_1 = \frac{\partial \Phi}{\partial E_1} = \sum_{i=1}^{M}(S(E_T)_i - S(E_E)_i)\frac{\partial S(E_E)_i}{\partial E_1} = 0 \tag{20}$$

$$f_2 = \frac{\partial \Phi}{\partial E_2} = \sum_{i=1}^{M}(S(E_T)_i - S(E_E)_i)\frac{\partial S(E_E)_i}{\partial E_2} = 0$$

$$\vdots$$

$$f_N = \frac{\partial \Phi}{\partial E_N} = \sum_{i=1}^{M}(S(E_T)_i - S(E_E)_i)\frac{\partial S(E_E)_i}{\partial E_N} = 0$$

where N is the number of material properties to be determined. This system can be rewritten as a residual by $R(E_E)=[J^T](S(E_T)-S(E_E))=0$ where $$J = \begin{bmatrix} \frac{\partial S(E_E)_1}{\partial E_1} & \cdots & \frac{\partial S(E_E)_1}{\partial E_N} \\ \vdots & \ddots & \vdots \\ \frac{\partial S(E_E)_M}{\partial E_1} & \cdots & \frac{\partial S(E_E)_M}{\partial E_N} \end{bmatrix}$$

the Jacobian matrix. By recasting this expression as a residual, a Taylor polynomial evaluated at $E_T$ and expanded about $E_E$ can be written, $$R(E_E = E_T) = 0 \tag{21}$$

$$= [J^T](S(E_T) - S(E_E)) +$$

$$(E_T - E_E)\frac{\partial R}{\partial E}\bigg|_{E_E} + \frac{(E_T - E_E)^2}{2!}\frac{\partial^2 R}{\partial E^2}\bigg|_{E_E} + \cdots$$

Figure 15:
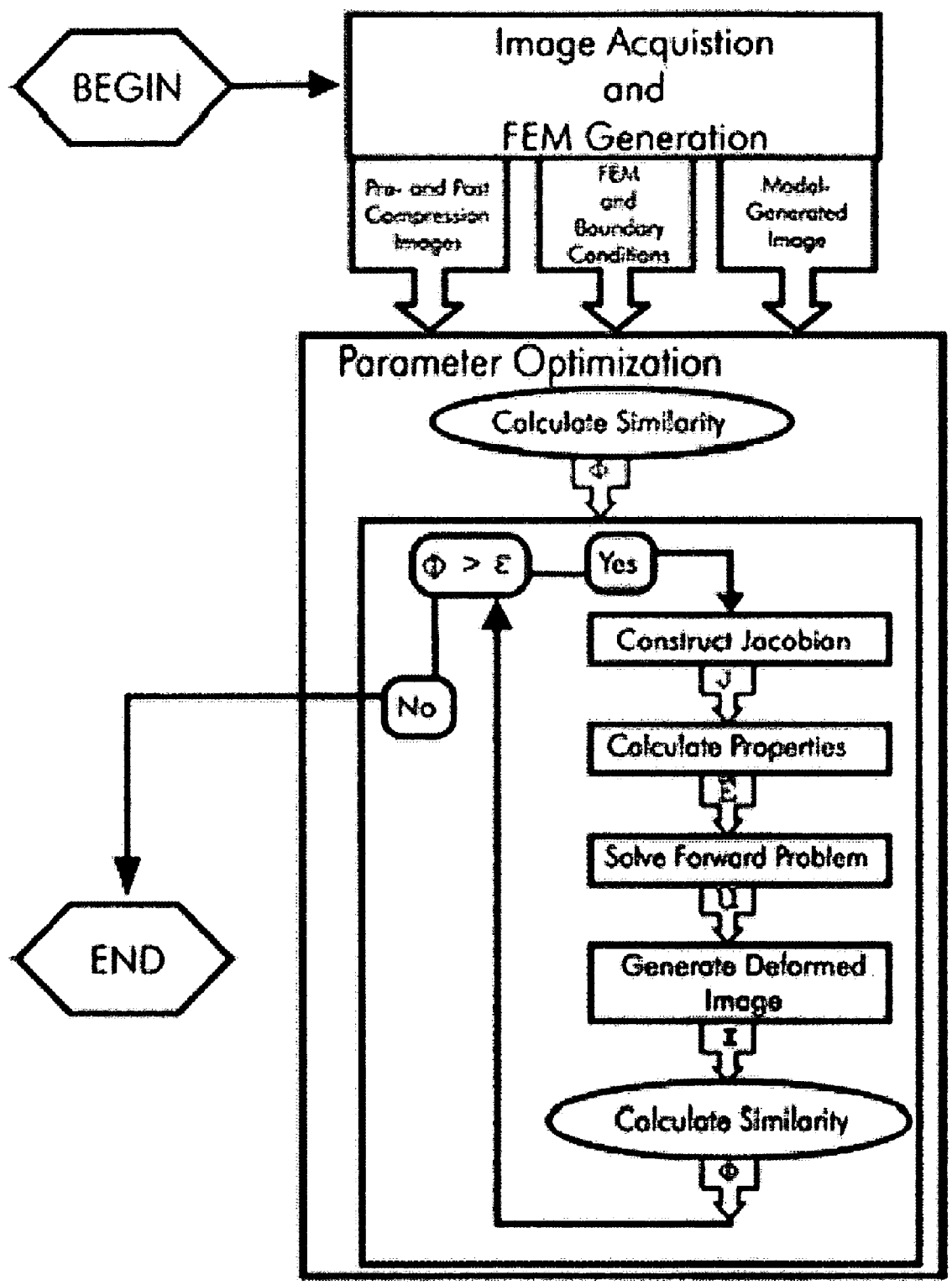
FIG. 15 is a flow chart of a method for solving an image-similarity based elastography problem in accordance with the present invention.

Rewriting this equation and neglecting higher order derivatives, the expression becomes, $$[H]\Delta E = [J^T](S(E_T)-S(E_E)) \tag{22}$$

where $\Delta E = E_T - E_E$, and $H = [J^T J]$, an approximation to the Hessian. In all other methodologies that use a similar non-linear iterative-based algorithm, the Jacobian matrix is $[\partial \bar{u}^c/\partial E]$ where $\bar{u}^c$ would be the model-calculated displacements. This marks a fundamental shift away from direct measurement/comparison of displacements within the reconstruction framework. Of course this simplification does come at a computational cost in that the Jacobian as defined must be calculated numerically, i.e. backward difference estimate of derivative (the sacrifice being convergence rate and the truncation error associated with a finite difference approximation of the derivative). Within the system of equations shown in the expression (22), often the Hessian matrix, [H], is ill-conditioned and a Levenberg-Marquardt approach is adopted. This results in the following system, $$([H]+\alpha[I])\Delta E=[J^T](S(E_T)-S(E_E)) \tag{23}$$

where $\alpha$ is the standard Levenberg-Marquardt parameter and I is the identity matrix. The strategy chosen for regularization is by Joachimowicz et al. and involves a regularization parameter proportional to the trace of the Hessian and the square of the residual similarity error. With equation (23) and the regularization method established, the framework is provided for iteratively updating the material properties within the scanning region. Spatial averaging of the property distribution and solution relaxation techniques may be used to enhance numerical stability. FIG. 15 is a flow chart of a method for solving an image-similarity based elastography problem in accordance with the MIE method.

Figure 16:
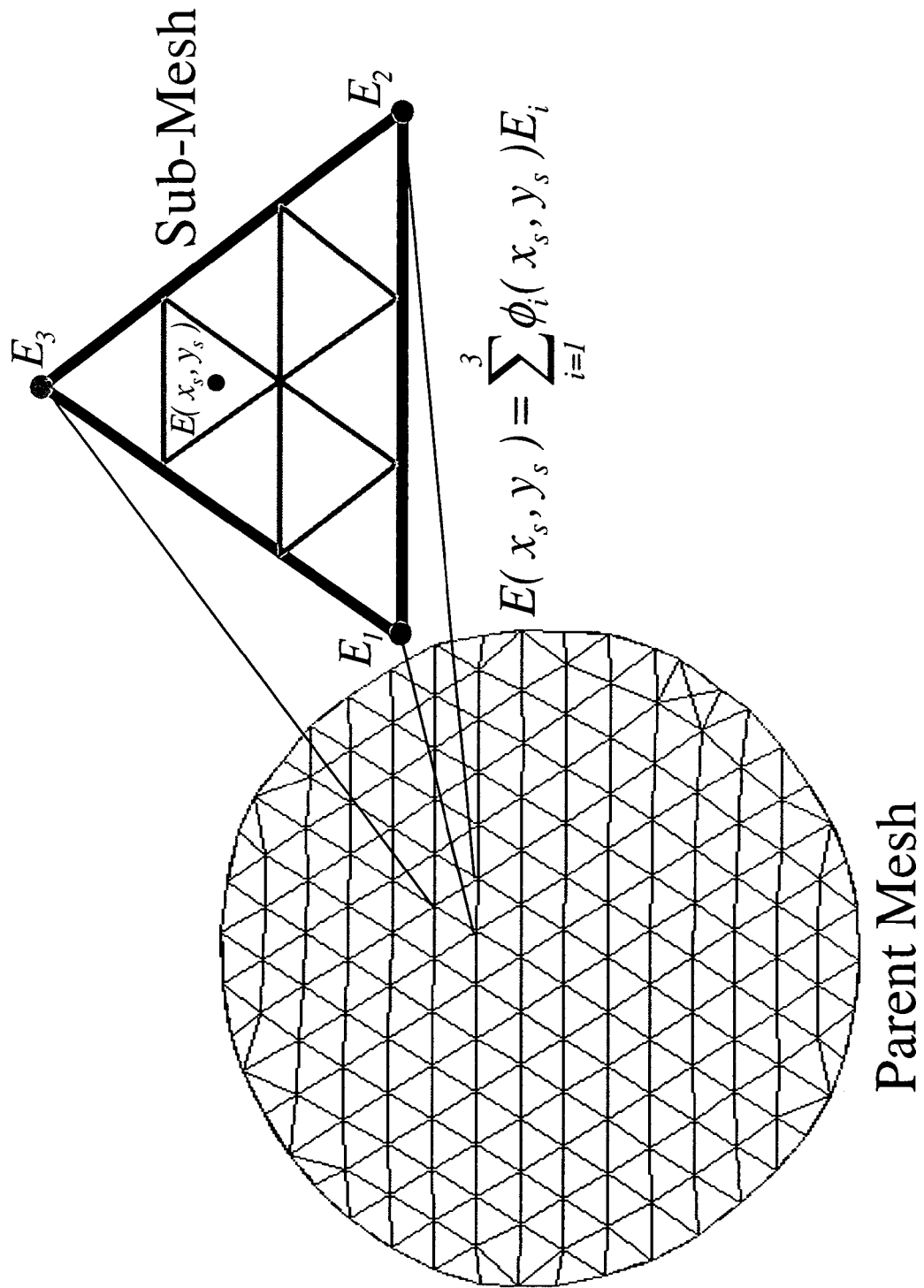
FIG. 16 is a graphical representation of a parent mesh for material properties with an underlying refined mesh designated in accordance with the present invention.

Another aspect of model-based inverse problems is that sufficient spatial discretization must be provided to resolve the description of the physics. However in equation (23), the algorithm requires a full N×N matrix inversion to solve for the material property update. Often in these types of inverse problems, the level of discretization required to resolve the physics associated with model exceeds that of which is practical in solving for a material property update, i.e. the calculation in equation (23). This is primarily due to the ill-conditioned nature of the Hessian in these types of problems which only worsens with increased degrees of freedom. As a result, a multi-grid strategy has been adopted which is generally illustrated in FIG. 16. FIG. 16 is a graphical representation of a parent mesh for material properties with an underlying refined mesh designated in accordance with the present invention. In this approach, each element on the fine submesh belongs to a parent element. The material property distribution is represented at the nodes of the parent mesh and is interpolated to the elements on the submesh using local Lagrange polynomial basis functions. This permits the material properties to directly influence the refined-mesh calculations yet maintains reasonable computational burden with respect to the inverse problem. This sub-mesh/parent-mesh framework is simpler to implement than unstructured dual-mesh techniques.

Figure 17:
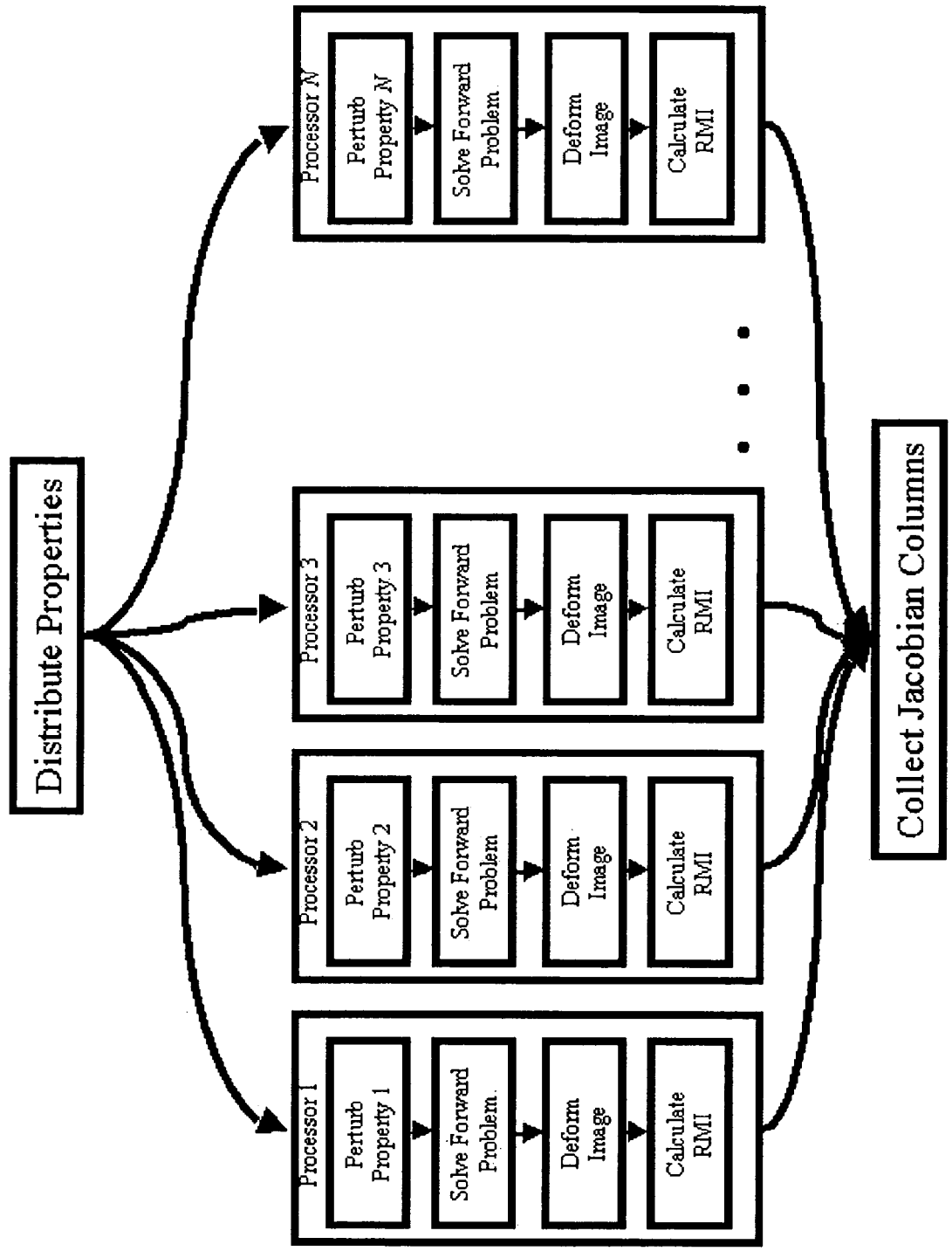
FIG. 17 is a flow diagram of a parallel processing scheme to determine image elasticity parameters utilizing modality independent elastography methods in accordance with the present invention.
Figure 19:
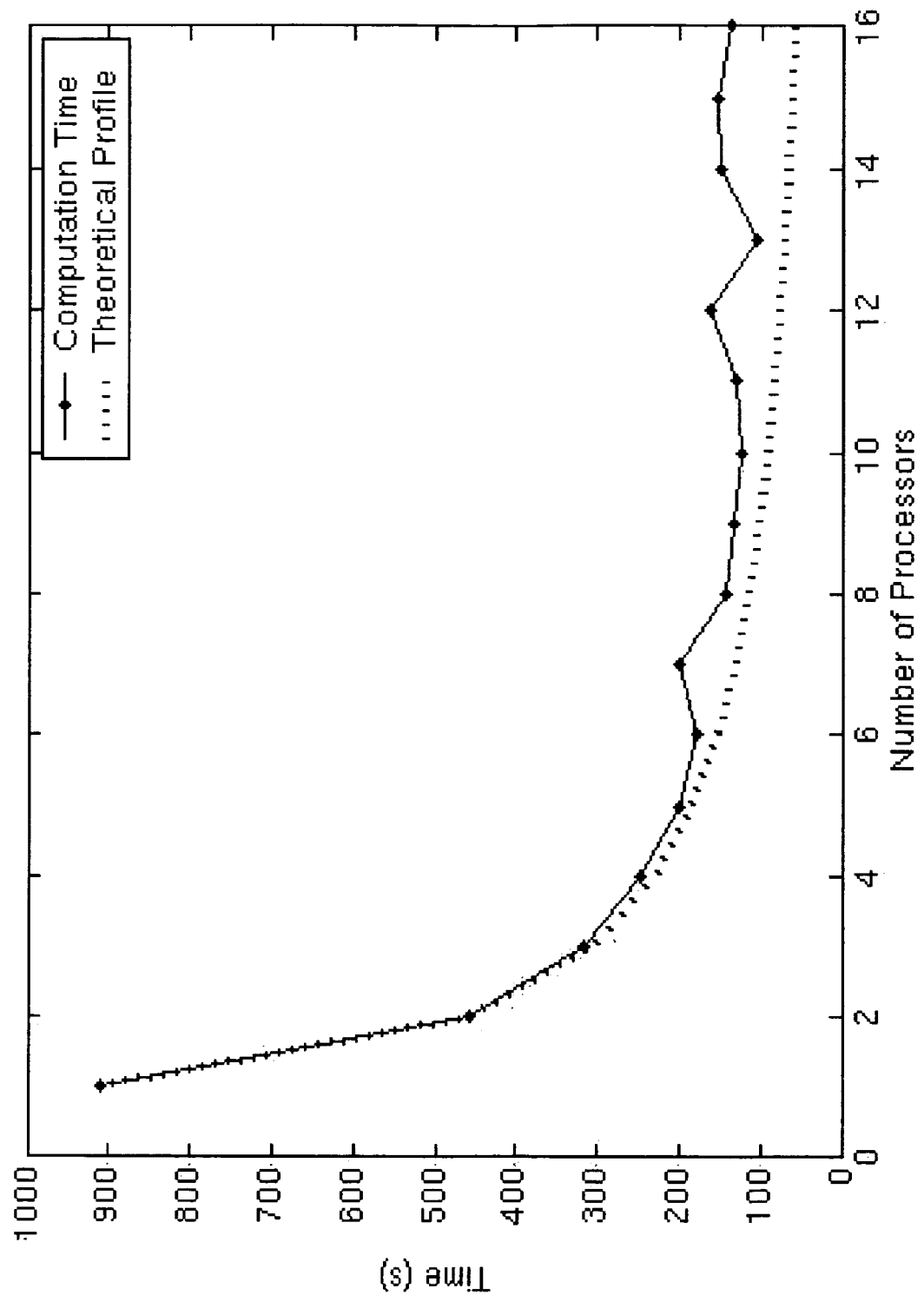
FIG. 19 is a graph showing the solution time for determining image elasticity parameters utilizing modality independent elastography versus the number of processors utilized.

Another aspect of the present invention is the parallelization of computation using the Message Passing Interface (MPI). The construction of inverse problems is well-suited for parallelization. For example, to determine the Jacobian matrix as illustrated in FIG. 15, each material property must be systematically perturbed and resultant changes in image similarity are recorded. Each perturbation is independent and involves: changing a material property, calculating a finite element model solution, deforming an image based on this calculation, and calculating image similarity. This arrangement of independent events is ideally suited to parallelization and is common in model-based inverse problems. FIG. 17 illustrates the current, albeit somewhat naive, parallelization strategy adopted in this preliminary work. It should be noted that the algorithm has been designed for a nine-node, eighteen-processor Pentium cluster which involves partitioning the Jacobian into sixteen separate sets of material properties with one node serving as the master node. FIG. 17 is a flow diagram of a parallel processing scheme to determine image elasticity parameters utilizing modality independent elastography methods in accordance with the present invention. FIG. 19 is a graph showing the solution time for determining image elasticity parameters utilizing modality independent elastography versus the number of processors utilized.

Figure 18:
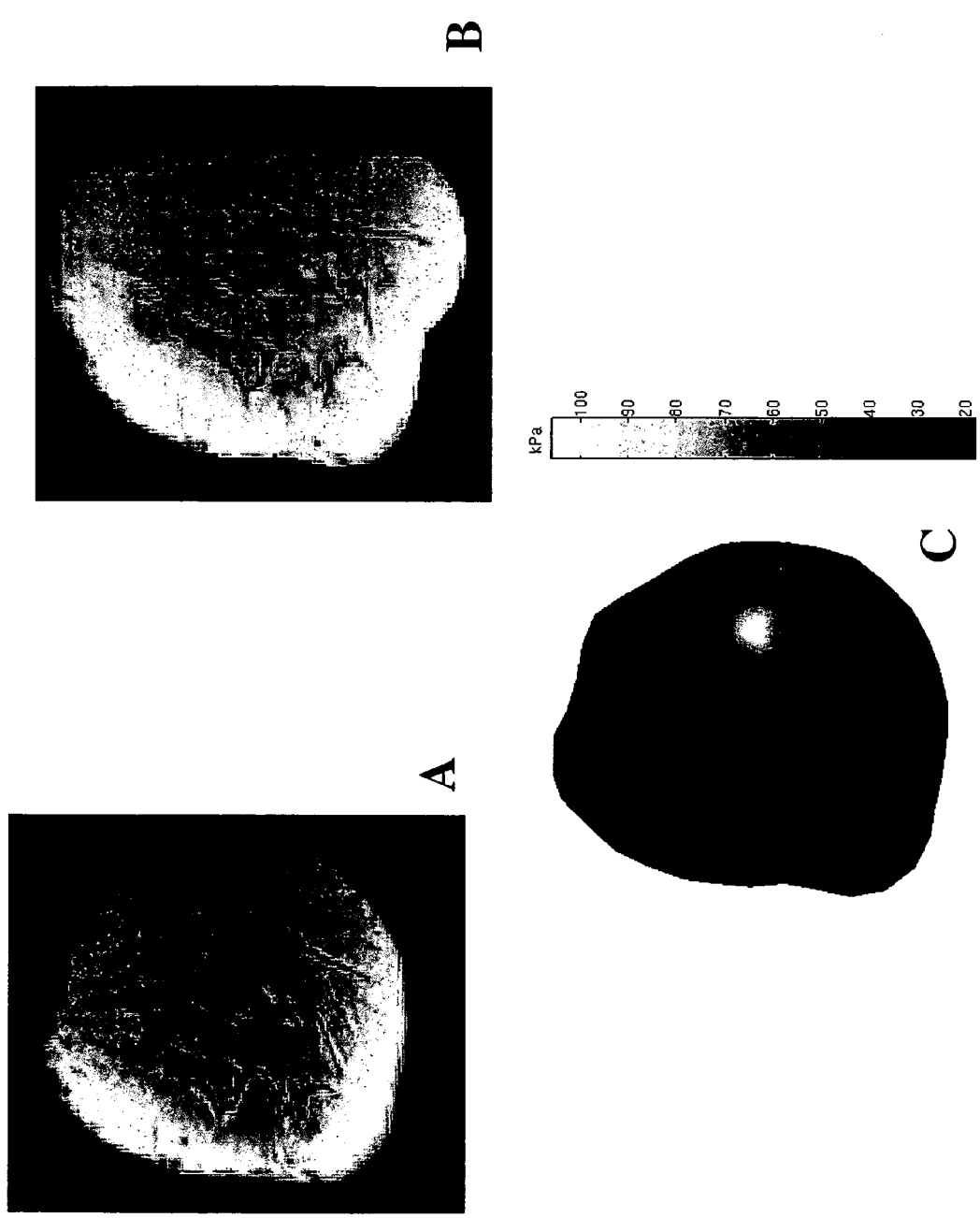
FIG. 18A is a source image of an uncompressed breast captured by magnetic resonance imaging.
FIG. 18B is a simulated post-deformed target counterpart image of FIG. 18A.
FIG. 18C depicts the spatial distribution of Young's modulus based on a finite element model simulation created from FIGS. 18A-18B.

A series of experiments were performed in two-dimensions using a frontal breast cross section as acquired from a standard magnetic resonance imaging protocol. FIG. 18A illustrates the MR cross-sectional breast image while FIG. 18B shows the corresponding deformed image resulting from the application of a soft-tissue finite element model of tissue compression. FIG. 18C shows the spatial distribution of Young's modulus for the simulation. FIGS. 18A and 18B demonstrate the applied boundary conditions whereby the breast is compressed from the right a fixed displacement. In this simulation, the breast boundary left of the midline was fixed. Boundary regions right of the midline and not in contact with the compressor were allowed to move freely. The pre-images and post-images (FIG. 18A, 18B, respectively), the boundary conditions, and an initial homogeneous Young's modulus spatial description were used as inputs to the image reconstruction algorithm and elasticity images were compared across the varying image similarity metrics. In addition, an elasticity image reconstruction was conducted to investigate the multi-grid strategy generally described above. Poisson's ratio was assumed to be known a priori and is not part of the parameter reconstruction. In addition, the material properties at the periphery of the computational domain are assumed to be known and constant, i.e. only internal properties are treated as unknowns; by constraining the modulus at the boundary points, the elastic values are absolute and not relative even in the presence of employing displacement and stress-free boundary conditions only.

Figure 20:
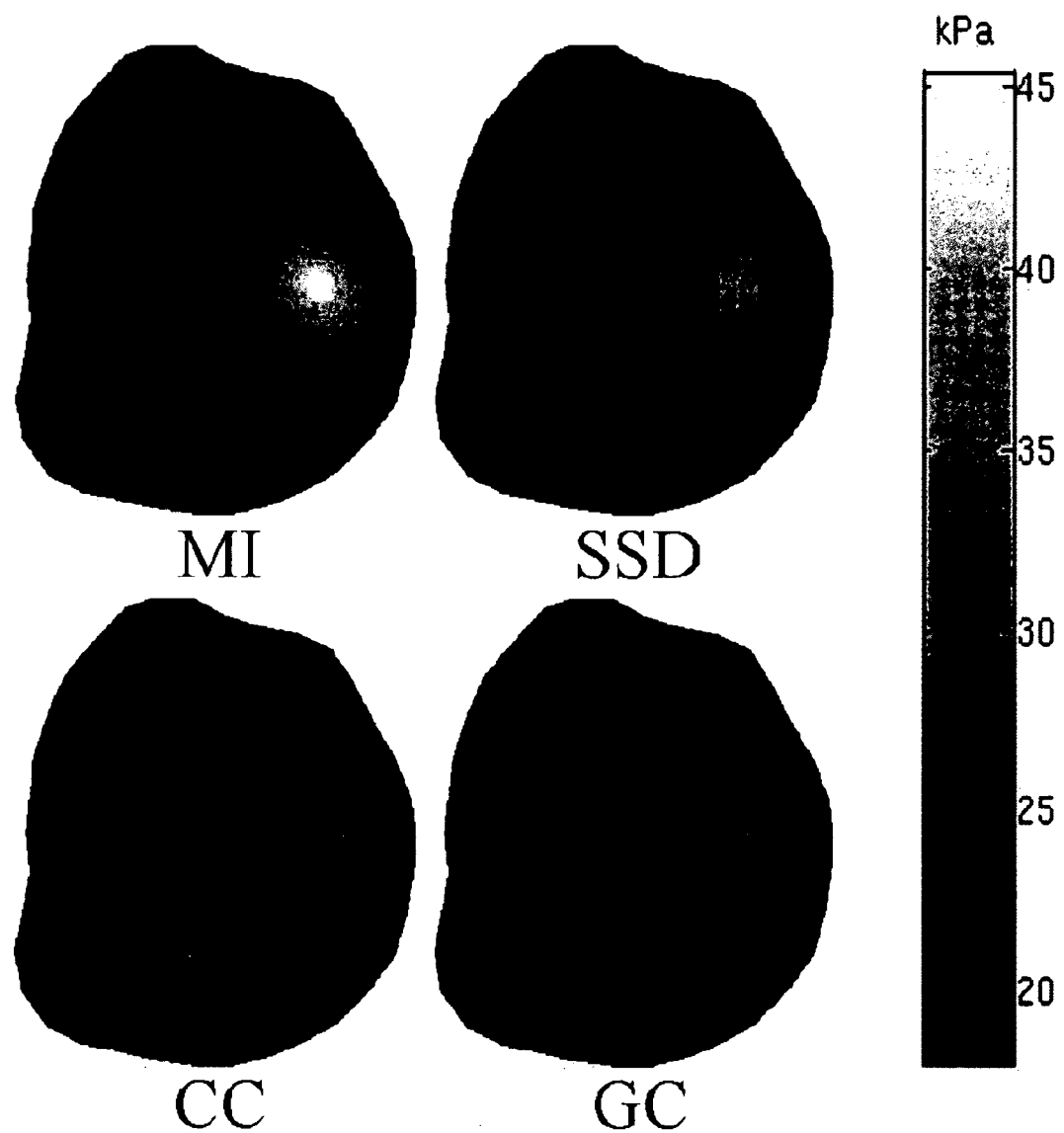
FIG. 20 is a graphical comparison of four elasticity image reconstructions using mutual information (MI), sum of the squared difference (SSD), correlation coefficient (CC), and correlation coefficient of the gradient image (GC)
Figure 21:
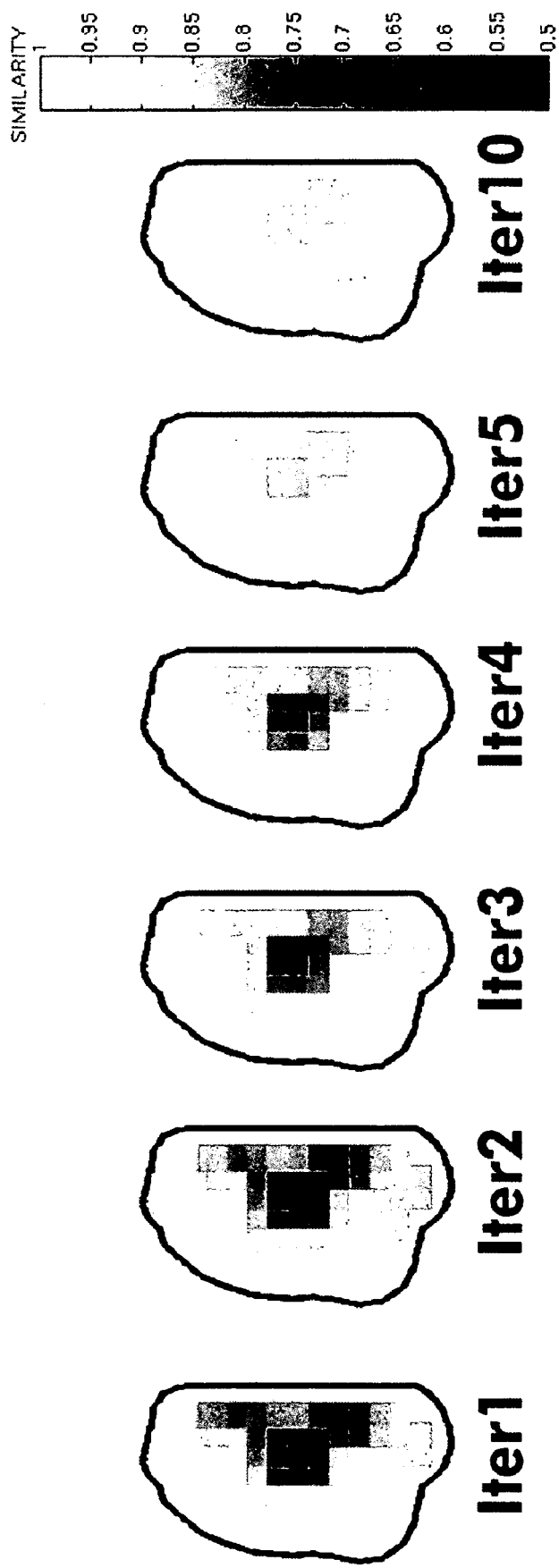
FIG. 21 is a graphical representation of the change in similarity for the first ten iterations of a gradient image (GC-based) reconstruction wherein the similarity metric has been normalized to unity where unity represents perfect similarity.
Figure 22:
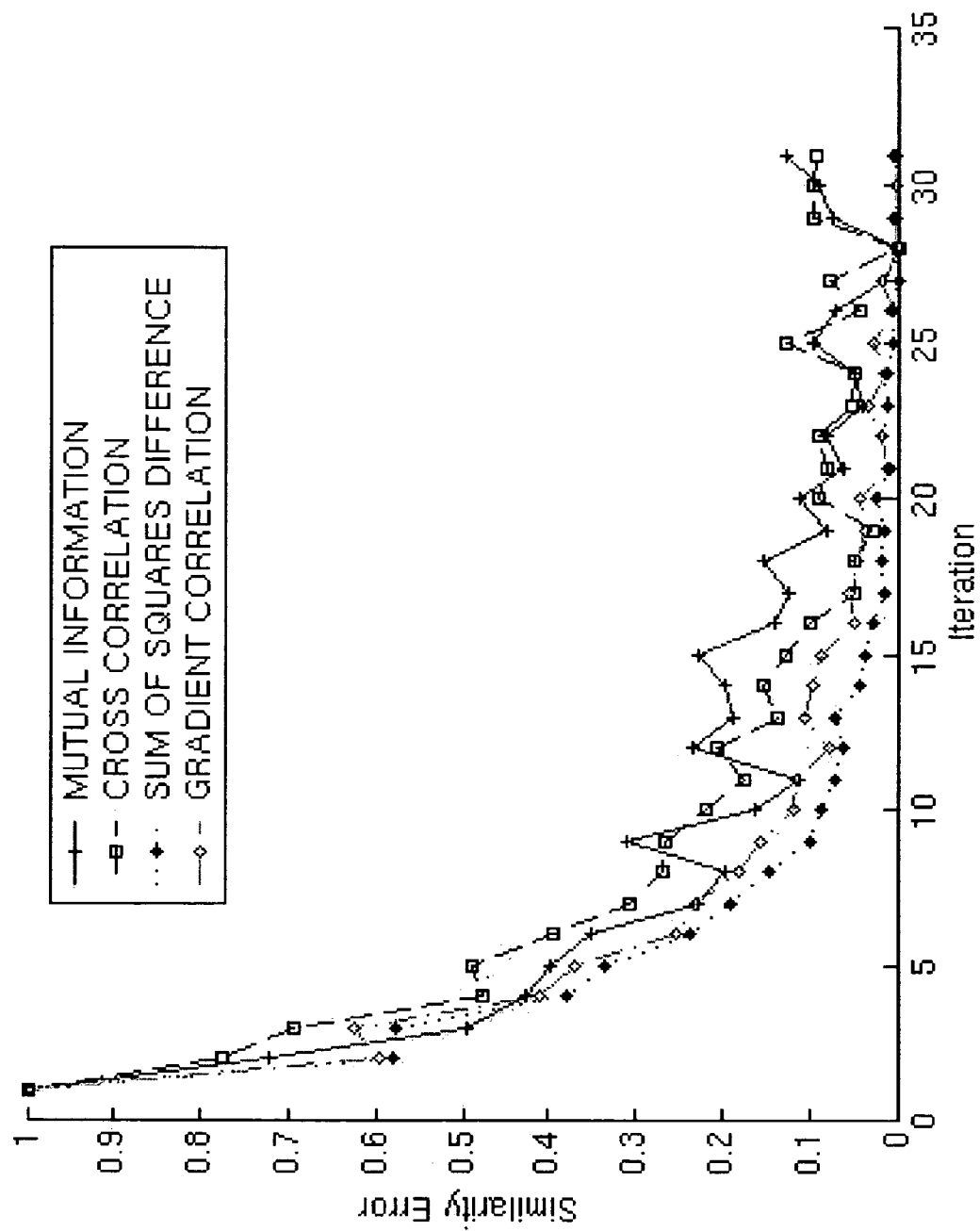
FIG. 22 is a graph depicting the normalized convergence behavior for the four reconstructions shown in FIG. 20.
Figure 23:
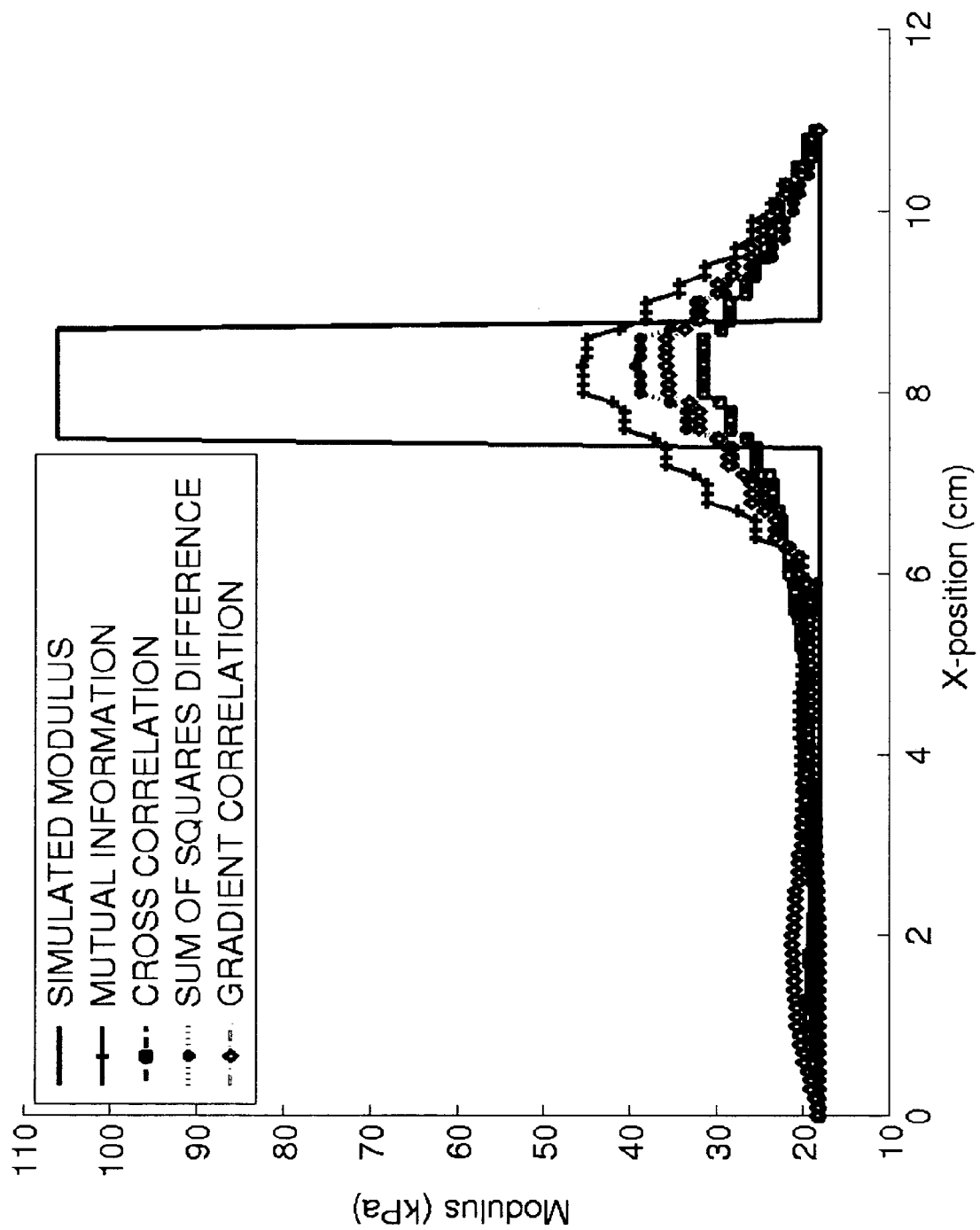
FIG. 23 is a graph depicting the results of moduli reconstruction in a lateral transect across the simulated tumor region for the four reconstructions shown in FIG. 20.

FIG. 20 is a graphical comparison of four elasticity image reconstructions using mutual information (MI), sum of the squared difference (SSD), correlation coefficient (CC), and correlation coefficient of the gradient image (GC). FIG. 22 is a graph depicting the normalized convergence behavior for the four reconstructions shown in FIG. 20. FIG. 23 is a graph depicting the results of moduli reconstruction in a lateral transect across the simulated tumor region for the four reconstructions shown in FIG. 20. FIG. 21 is a graphical representation of the change in similarity for the first ten iterations of a gradient image (GC-based) reconstruction wherein the similarity metric has been normalized to unity and where unity represents perfect similarity.

Figure 24:
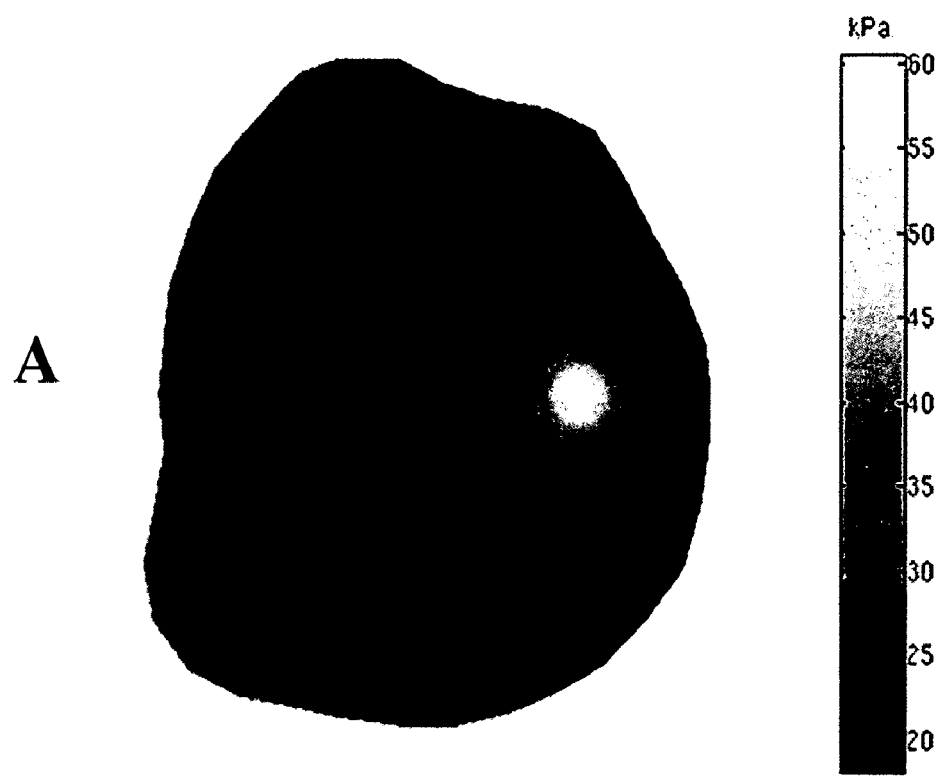
FIG. 24A is a graphical representation of a spatial distribution when a tumor is closer to a parent node.
FIG. 24B is a graph depicting the results of modulus reconstruction in a lateral transect across the simulated tumor region for the reconstruction shown in FIG. 24A.
Figure 24:
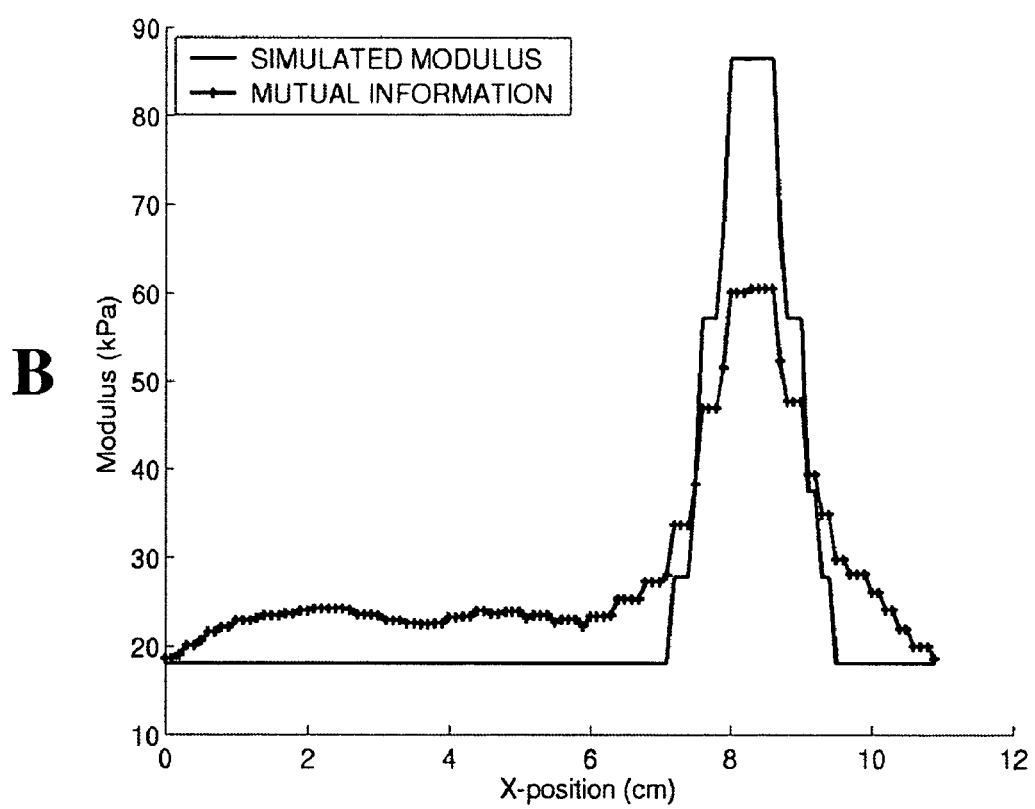

FIG. 20 illustrates a simulation-based elasticity image reconstruction based on the data provided by the images in FIGS. 18A-18C, boundary conditions, and an initial homogeneous stiffness property distribution. For each similarity method shown, the localization of the tumor can be seen albeit at different contrast levels from the surrounding tissue. Based on a visual assessment, the MI-based metric appeared to perform best followed by SSD, GC, and CC, respectively. FIG. 21 illustrates the regional change in similarity for a normalized similarity scale over the first ten iterations of a GC-based reconstruction. The sequence of grayscale distributions demonstrates an improved similarity between the deformed source and target images by the progressive lightening of the image. FIG. 22 shows a normalized similarity error for each of the reconstructions shown in FIG. 20. To better assess the capturing of the stiff inclusion, a lateral transect was taken in the region of the tumor and compared to the analytic and is shown in FIG. 23. For the computational experiment shown in FIG. 20, the location of the tumor was central in relation to the spatial position of the parent element nodes (i.e. within the parent element). When the simulated tumor was moved spatially closer to a parent element node, the resulting MI-based elasticity image reconstruction is shown in FIGS. 24A-24B. FIG. 24A shows the spatial reconstruction of Young's modulus while FIG. 24*b* illustrates a similar lateral transect. In FIGS. 24A-24B, a clear improvement in tumor-to-surrounding tissue contrast has been achieved.

Figure 25:
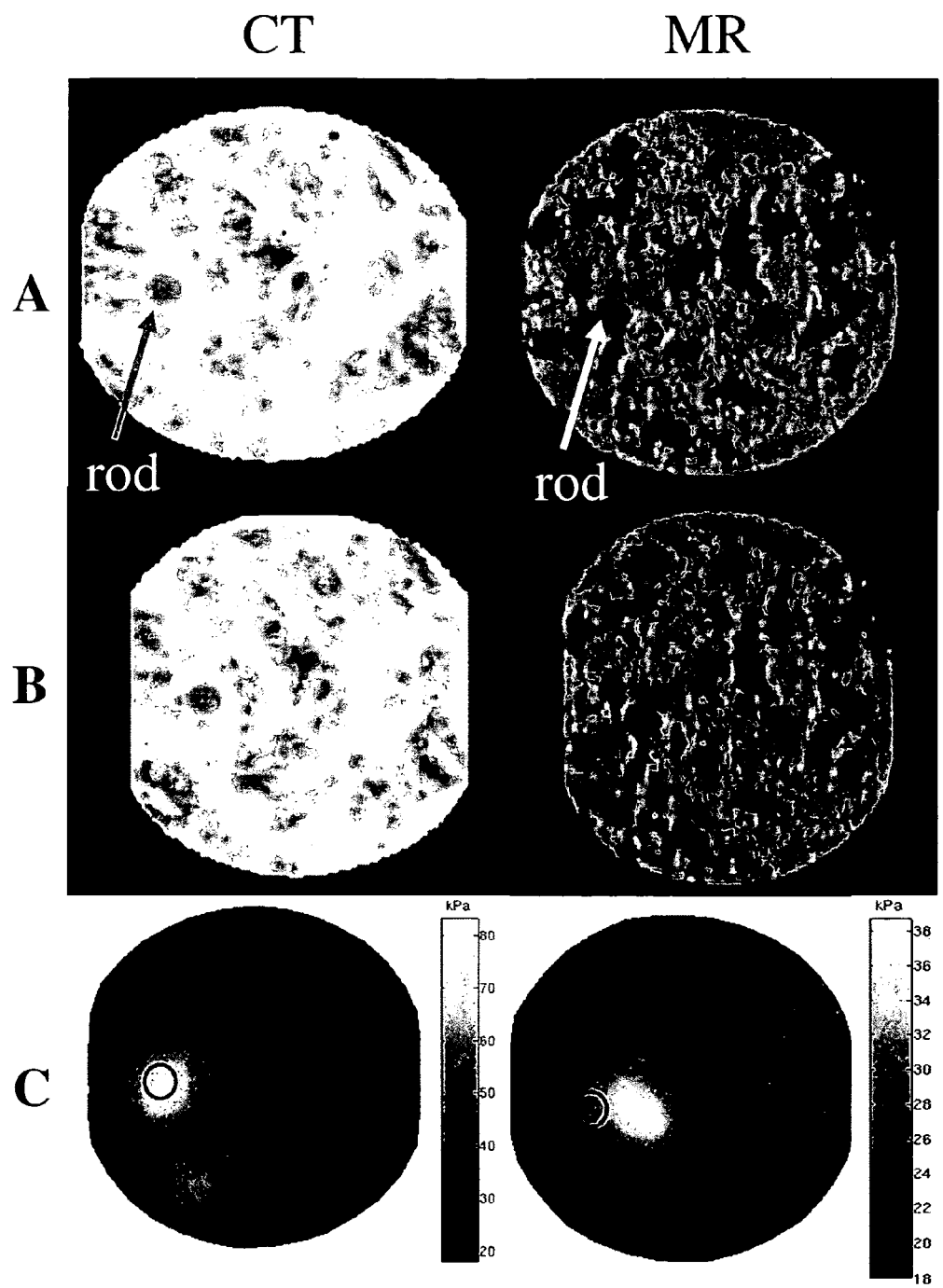
FIG. 25A is a graphical image comparison of a computed tomography image and magnetic resonance image for a pre-deformed source image.
FIG. 25B is a graphical image comparison of a computed tomography image and magnetic resonance image for a post-deformed target image correlated to the pre-deformed source image of FIG. 25A.
FIG. 25C is a graphical image comparison of a computed tomography image and magnetic resonance image for an elasticity image determined based upon the pre-deformed source image and post-deformed target image of FIGS. 25A-25B.
Figure 26:
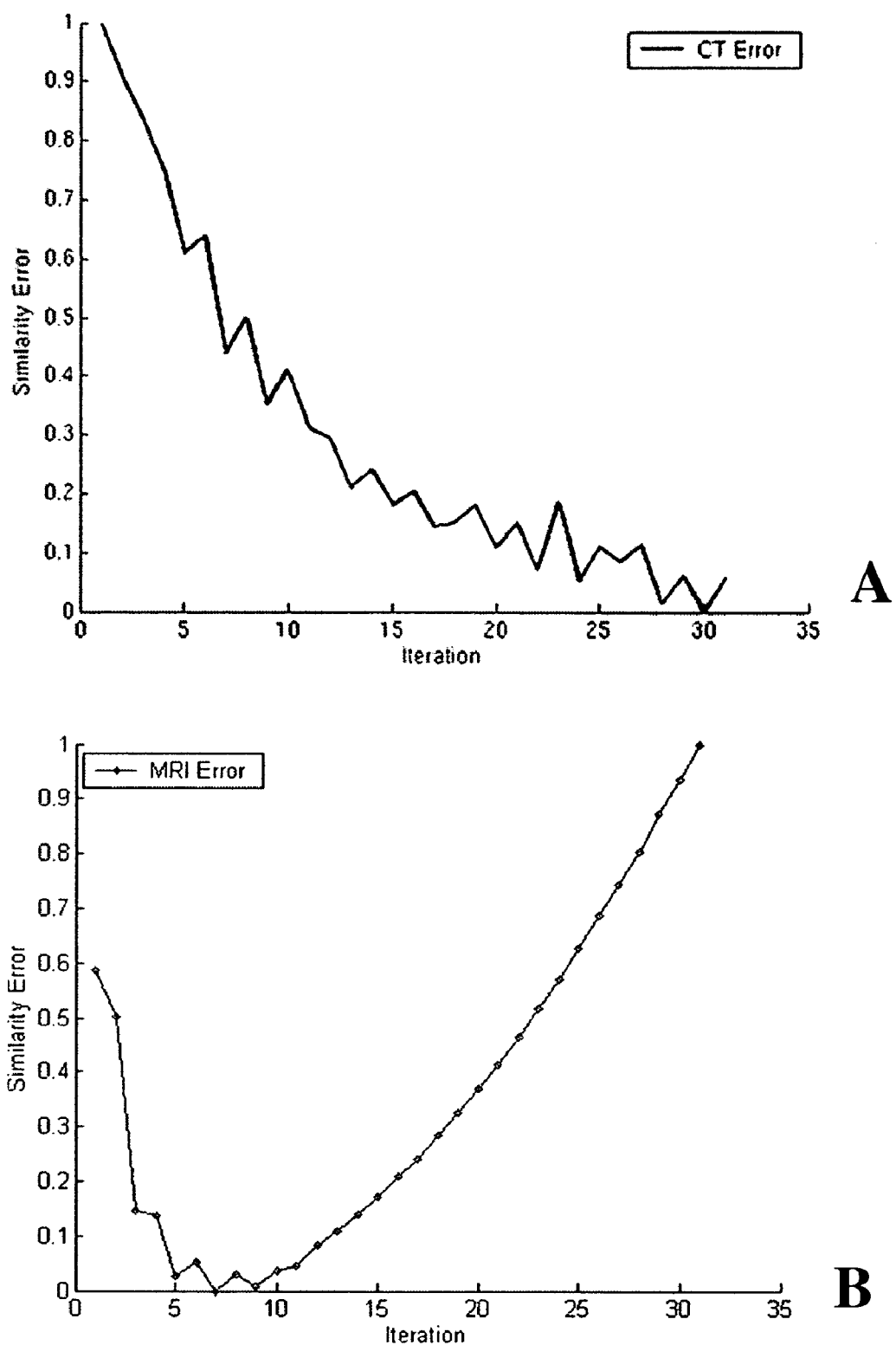
FIG. 26A is a graph depicting the similarity error per iteration for the phantom computed tomography image reconstruction in FIGS. 25A-25C.
FIG. 26B is a graph depicting the similarity error per iteration for the phantom magnetic resonance image reconstruction in FIGS. 25A-25C.

FIG. 25A is a graphical image comparison of a computed tomography image and magnetic resonance image for a pre-deformed source image. FIG. 25B is a graphical image comparison of a computed tomography image and magnetic resonance image for a post-deformed target image correlated to the pre-deformed source image of FIG. 25A. FIG. 25C is a graphical image comparison of a computed tomography image and magnetic resonance image for an elasticity image determined based upon the pre-deformed source image and post-deformed target image of FIGS. 25A-25B. FIG. 26A is a graph depicting the similarity error per iteration for the phantom computed tomography image reconstruction in FIGS. 25A-25C. FIG. 26B is a graph depicting the similarity error per iteration for the phantom magnetic resonance image reconstruction in FIGS. 25A-25C.

Figure 27:
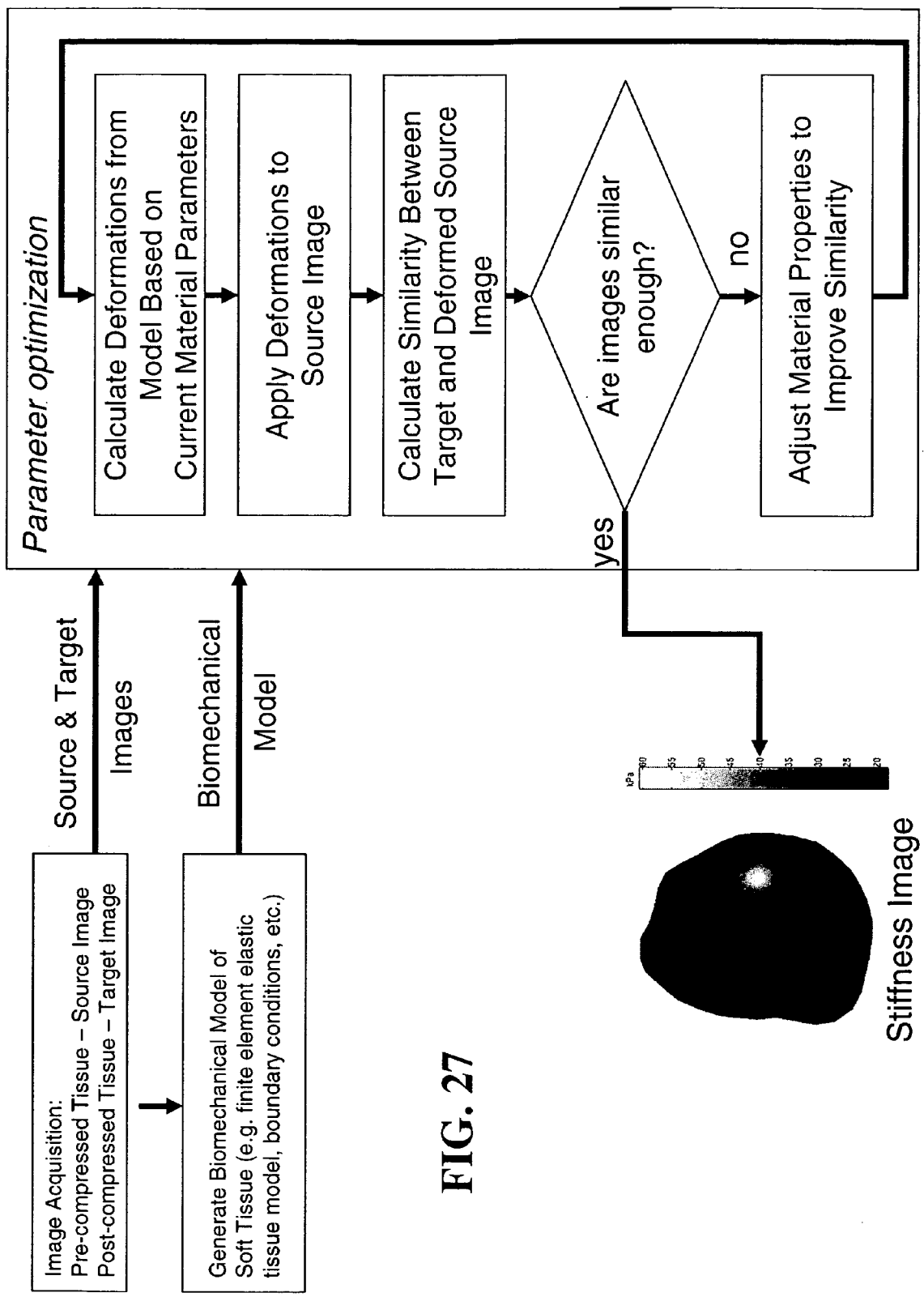
FIG. 27 is a flow chart of a general method for determining image similarities in accordance with the present invention.

The above embodiments represent one specific realization of the elasticity imaging framework. The broad inventive concept disclosed herein is that image similarity can be used to characterize material properties of tissue. FIG. 27 illustrates the more general form of the algorithm. More specifically, in the above embodiments, a specific optimization technique is utilized (e.g. Levenberg Marquardt method), but other methods could be utilized without departing from the present invention. In addition, the above embodiments use a model based on linear elasticity theory. This could be exchanged for a different model of tissue (e.g. a viscoelastic model and the like). Ultimately, this would change the particular material parameters being sought within the elasticity imaging framework, but the framework is still the same. In addition, the above embodiments have been specifically cast as a static analysis, i.e., non-temporally varying. It is possible to recast this same framework for a transient analysis, e.g., elastic wave motion. This would require more development in that images would need to be acquired over time; but, in principle, the algorithm described in FIG. 27 is still consistent with this alternative embodiment as well as the others referred to herein.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes may be made to the embodiments described above without departing from the broad inventive concept thereof. It is understood, therefore, that this invention is not limited to the particular embodiments disclosed, but it is intended to cover modifications within the spirit and scope of the present invention.

I claim:

1. A method for identifying anomaly regions in a material sample comprising:
   (a) acquiring pre-deformed images of a material sample;
   (b) acquiring post-deformed images of the material sample;
   (c) generating a model having a spatial distribution of properties and that simulates deforming the pre-deformed images of the material sample based upon the pre-deformed and post-deformed images, the model including model-deformed images created by simulating a deformation of the acquired pre-deformed images;
   (d) calculating, using a similarity metric, a change in regional similarity between the model-deformed images and the acquired post-deformed images;
   (e) optimizing the model by determining how the similarity calculated in step (d) changes with respect to changes in the spatial distribution of properties, and subsequently adjusting the model, including the spatial distribution of properties, to improve the similarity between the model-deformed images and the acquired post-deformed images;
   (f) iteratively repeating steps (d)-(e) a predetermined number of times or until a prescribed condition regarding the quality of the model is met; and
   (g) identifying anomaly regions within the material sample utilizing the optimized model.

2. The method according to claim 1, further comprising:
   (h) producing an output that includes a stiffness image based upon the optimized model which consequently optimizes the similarity between the model-deformed images and the acquired images.

3. The method according to claim 2, wherein the output includes a series of stiffness images.

4. The method according to claim 1, wherein the predetermined number of times is two or more.

5. The method according to claim 4, wherein the predetermined number of times is restricted when the calculated change in regional similarity between the model-deformed images and the acquired post-deformed images is within a predetermined error tolerance.

6. The method according to claim 4, wherein the predetermined number of times is between approximately five and thirty.

7. The method according to claim 1, wherein the material sample includes a tissue sample.

8. The method according to claim 7, wherein the tissue sample includes breast tissue.

9. The method according to claim 1, wherein the model is based on one of an elastic model, a viscoelastic model, and a hyperelastic model.

10. The method according to claim 1, wherein the model is based on any model that accurately represents the deformation behavior of any material.

11. The method according to claim 1, wherein the model is based on finite element analysis including initial and boundary conditions.

12. The method according to claim 1, wherein step (e) includes a plurality of properties.

13. The method according to claim 1, wherein the properties include material properties.

14. The method according to claim 1, wherein the pre-deformed images of the material sample are acquired using one of magnetic resonance imaging, computed tomography imaging, ultrasound imaging and optical imaging.

15. The method according to claim 1, further comprising:
   (h) measuring the elastic properties of the material sample utilizing the optimized model; and
   (i) identifying elasticity anomaly regions within the material sample utilizing the optimized model.

16. The method according to claim 1, wherein the spatial distribution of properties of the model is based upon a Jacobian matrix whereby each column of the Jacobian matrix represents the change in regional image similarity with respect to each perturbed material property of the model.

17. The method according to claim 1, wherein steps (d)-(f) utilize a Levenberg-Marquardt approach to iterative optimization.

18. The method according to claim 1, wherein the optimizing of step (d) includes selecting and perturbing a property in the spatial domain.

19. A method for measuring the elastic properties of a material sample comprising:
   (a) acquiring a source image of a pre-deformed material sample;
   (b) acquiring a target image of a post-deformed material sample;
   (c) generating a model having a spatial distribution of properties and that simulates deforming the source image of the material sample based upon the source and target images, the model including a model-deformed image created by simulating a deformation of the acquired source image;
   (d) calculating, using a similarity metric, a change in regional similarity between the model-deformed image and the target image;
   (e) optimizing the model by determining how the similarity calculated in step (d) changes with respect to changes in the spatial distribution of properties, and subsequently adjusting the model, including the spatial distribution of properties, to improve the similarity between the model-deformed image and the target image;
   (f) iteratively repeating steps (d)-(e) a predetermined number of times or until a prescribed condition regarding the quality of the model is met; and
   (g) identifying elasticity anomaly regions within the material sample utilizing the optimized model.

20. An article of manufacture for identifying anomaly regions in a material sample, the article of manufacture comprising a computer-readable medium encoded with computer-executable instructions for performing a method comprising:
   (a) acquiring pre-deformed images of a material sample;
   (b) acquiring post-deformed images of the material sample;
   (c) generating a model having a spatial distribution of properties and that simulates deforming the pre-deformed images of the material sample based upon the pre-deformed and post-deformed images, the model including model-deformed images created by simulating a deformation of the acquired pre-deformed images;
   (d) calculating, using a similarity metric, a change in regional similarity between the model-deformed images and the acquired post-deformed images;
   (e) optimizing the model by determining how the similarity calculated in step (d) changes with respect to changes in the spatial distribution of properties, and subsequently adjusting the model, including the spatial distribution of properties, to improve the similarity between the model-deformed images and the acquired post-deformed images;
   (f) iteratively repeating steps (d)-(e) a predetermined number of times or until a prescribed condition regarding the quality of the model is met; and
   (g) identifying anomaly regions within the material sample utilizing the optimized model.

21. An article of manufacture for measuring the elastic properties of a material sample, the article of manufacture comprising a computer-readable medium encoded with computer-executable instructions for performing a method comprising:
   (a) acquiring a source image of a pre-deformed material sample;
   (b) acquiring a target image of a post-deformed material sample;
   (c) generating a model having a spatial distribution of properties and that simulates deforming the source image of the material sample based upon the source and target images, the model including a model-deformed image created by simulating a deformation of the acquired source image;
   (d) calculating, using a similarity metric, a change in regional similarity between the model-deformed image and the target image;
   (e) optimizing the model by determining how the similarity calculated in step (d) changes with respect to changes in the spatial distribution of properties, and subsequently adjusting the model, including the spatial distribution of properties, to improve the similarity between the model-deformed image and the target image;
   (f) iteratively repeating steps (d)-(e) a predetermined number of times or until a prescribed condition regarding the quality of the model is met; and
   (g) identifying elasticity anomaly regions within the material sample utilizing the optimized model.

* * * * *